(12) United States Patent
Brown

(10) Patent No.: US 9,984,094 B2
(45) Date of Patent: May 29, 2018

(54) COMPUTERIZED SHARING OF DIGITAL ASSET LOCALIZATION BETWEEN ORGANIZATIONS

(71) Applicant: Fision Holdings, Inc., Minneapolis, MN (US)

(72) Inventor: Michael Brown, Minneapolis, MN (US)

(73) Assignee: FISION HOLDINGS, INC., Minneapolis, MN (US)

( * ) Notice: Subject to any disclaimer, the term of this patent is extended or adjusted under 35 U.S.C. 154(b) by 0 days. days.

(21) Appl. No.: 14/896,656

(22) PCT Filed: Jun. 6, 2014

(86) PCT No.: PCT/US2014/041242
§ 371 (c)(1),
(2) Date: Dec. 7, 2015

(87) PCT Pub. No.: WO2014/197770
PCT Pub. Date: Dec. 11, 2014

(65) Prior Publication Data
US 2016/0124986 A1    May 5, 2016

Related U.S. Application Data

(60) Provisional application No. 61/832,582, filed on Jun. 7, 2013, provisional application No. 61/833,795, filed
(Continued)

(51) Int. Cl.
*G06F 7/02* (2006.01)
*G06F 17/30* (2006.01)
(Continued)

(52) U.S. Cl.
CPC ...... *G06F 17/30165* (2013.01); *G06F 17/212* (2013.01); *G06F 17/30017* (2013.01);
(Continued)

(58) Field of Classification Search
CPC ...... G06F 21/10; G06F 21/62; G06F 17/3089; G06F 9/468; G06F 17/30017;
(Continued)

(56) References Cited

U.S. PATENT DOCUMENTS

2002/0156688 A1   10/2002   Horn et al.
2004/0015408 A1    1/2004   Rauen et al.
(Continued)

FOREIGN PATENT DOCUMENTS

WO    WO-2014197770 A2    12/2014
WO    WO-2014197770 A3    12/2014

OTHER PUBLICATIONS

"International Application Serial No. PCT/US2014/041242, International Search Report dated Oct. 29, 2015", 4 pgs.
(Continued)

*Primary Examiner* — Bruce M Moser
(74) *Attorney, Agent, or Firm* — Schwegman Lundberg & Woessner, P.A.

(57) ABSTRACT

A computerized system and method provides for sharing digital assets among multiple different organizations in a multi-organization system, and further providing that one or more of localized digital assets can be assembled using digital assets, templates and rules specified by different organizations. Further, the various organizations can contribute and share digital assets with organizations, while controlling the localization of the asset with brand or other information both as specified by the provider organization and as specified by the user organization.

18 Claims, 17 Drawing Sheets

Related U.S. Application Data on Jun. 11, 2013, provisional application No. 61/832,591, filed on Jun. 7, 2013, provisional application No. 61/833,826, filed on Jun. 11, 2013, provisional application No. 61/832,578, filed on Jun. 7, 2013, provisional application No. 61/833,832, filed on Jun. 11, 2013.

(51) Int. Cl.
  *G06F 17/21* (2006.01)
  *G06F 21/62* (2013.01)
  *G06F 21/60* (2013.01)
  *G06Q 10/10* (2012.01)

(52) U.S. Cl.
  CPC .... *G06F 17/3089* (2013.01); *G06F 17/30265* (2013.01); *G06F 17/30997* (2013.01); *G06F 21/604* (2013.01); *G06F 21/6209* (2013.01); *G06Q 10/10* (2013.01); *G06F 2221/2141* (2013.01)

(58) Field of Classification Search
  CPC ............ G06F 17/212; G06F 17/30265; G06F 17/30997; G06F 17/30165; G06F 21/6209
  See application file for complete search history.

(56) References Cited

U.S. PATENT DOCUMENTS

| | | | |
|---|---|---|---|
| 2005/0193335 A1* | 9/2005 | Dorai | G06F 17/30893 715/234 |
| 2007/0225996 A1* | 9/2007 | Haberman | G06F 17/30017 705/1.1 |
| 2008/0027749 A1 | 1/2008 | Meyer et al. | |
| 2008/0168135 A1 | 7/2008 | Redlich et al. | |
| 2010/0185520 A1 | 7/2010 | Gottfried | |
| 2013/0054736 A1 | 2/2013 | Hunt et al. | |
| 2013/0080579 A1* | 3/2013 | Gordon | H04L 65/608 709/217 |
| 2013/0154264 A1 | 6/2013 | Hatanaka et al. | |
| 2014/0365426 A1 | 12/2014 | Brown | |

OTHER PUBLICATIONS

"International Application Serial No. PCT/US2014/041242, Written Opinion dated Oct. 29, 2015", 7 pgs.

"U.S. Appl. No. 14/297,909, Non Final Office Action dated Apr. 29, 2016", 11 pgs.

"U.S. Appl. No. 14/297,909, Notice of Allowance dated Dec. 22, 2016", 11 pgs.

"U.S. Appl. No. 14/297,909, Response filed Oct. 26, 2016 to Non Final Office Action dated Apr. 29, 2016", 7 pgs.

"U.S. Appl. No. 15/583,300, Preliminary Amendment filed Dec. 8, 2017", 6 pgs.

"U.S. Appl. No. 14/297,909, Non-Final Office Action dated Apr. 29, 2016", 11 pgs.

"International Application Serial No. PCT/US2014/041242, International Preliminary Report on Patentability dated Dec. 17, 2015", 9 pgs.

* cited by examiner

| USER PROFILE TABLE /219 |||| 
|---|---|---|---|
| USER ID | USER NAME | USER ORGANIZATION ID | USER RIGHTS |
| USER ID 1 | USER NAME 1 | USER ORG ID 1 | USER RIGHTS 1 |
| USER ID 2 | USER NAME 2 | USER ORG ID 2 | USER RIGHTS 2 |
| ⋮ | ⋮ | ⋮ | ⋮ |
| USER ID N | USER NAME N | USER ORG ID N | USER RIGHTS N |

FIG. 1-3E-1

| DIGITAL ASSET LIBRARY TABLE /220 |||||| 
|---|---|---|---|---|---|
| ASSET ID | ORG ID | TITLE | STOR. LOC. | GROUPS | OTHER |
| ID 1 | ID 1 | TITLE 1 | LOC. 1 | GROUPS [LIST] | OTHER 1 |
| ID 2 | ID 2 | TITLE 2 | LOC. 2 | GROUPS [LIST] | OTHER 2 |
| ⋮ | ⋮ | ⋮ | ⋮ | ⋮ | ⋮ |
| ID N | ID N | TITLE N | LOC. N | GROUPS [LIST] | OTHER N |

FIG. 1-3E-2

| TEMPLATE TABLE /221 | | | |
|---|---|---|---|
| TEMPLATE ID | TEMPLATE NAME | STORAGE LOC | TEMPLATE INFO |
| TEMPLATE ID 1 | TEMPLATE NAME 1 | STORAGE LOC 1 | TEMPLATE INFO 1 |
| TEMPLATE ID 2 | TEMPLATE NAME 2 | STORAGE LOC 2 | TEMPLATE INFO 2 |
| ⋮ | ⋮ | ⋮ | ⋮ |
| TEMPLATE ID N | TEMPLATE NAME N | STORAGE LOC N | TEMPLATE INFO N |

FIG. 1-3E-3

| UI SKIN TABLE /217 | | | | |
|---|---|---|---|---|
| USER SKIN ID | ORGANIZATION ID | SKIN NAME | STORAGE LOC | OTHER SKIN INFO |
| SKIN NAME 1 | ORGANIZATION ID 1 | SKIN NAME 1 | STORAGE LOC 1 | OTHER SKIN INFO 1 |
| SKIN NAME 2 | ORGANIZATION ID 2 | SKIN NAME 2 | STORAGE LOC 2 | OTHER SKIN INFO 2 |
| ⋮ | ⋮ | ⋮ | ⋮ | ⋮ |
| SKIN NAME N | ORGANIZATION ID N | SKIN NAME N | STORAGE LOC N | OTHER SKIN INFO N |

FIG. 1-3E-4

| ASSET GROUP TABLE | | | | |
|---|---|---|---|---|
| ASSET ID | OWNER | GROUPS | ORGS PERMITTED | RIGHTS |
| ID 1 | ID 1 | GROUPS [LIST] | ORGS [LIST] | RIGHTS [LIST] |
| ID 2 | ID 2 | GROUPS [LIST] | ORGS [LIST] | RIGHTS [LIST] |
| ⋮ | ⋮ | ⋮ | ⋮ | ⋮ |
| ID N | ID N | GROUPS [LIST] | ORGS [LIST] | RIGHTS [LIST] |

FIG. 1-3F

| ASSET BUILD RULES | | |
|---|---|---|
| ASSET ID | PROVIDER RULES/VARIABLES | CONSUMER RULES/VARIABLES |
| ID 1 | [PROVIDER RULES/VARIABLES] | [CONSUMER RULES/VARIABLES] |
| ID 2 | [PROVIDER RULES/VARIABLES] | [CONSUMER RULES/VARIABLES] |
| ⋮ | ⋮ | ⋮ |
| ID N | [PROVIDER RULES/VARIABLES] | [CONSUMER RULES/VARIABLES] |

FIG. 1-3G

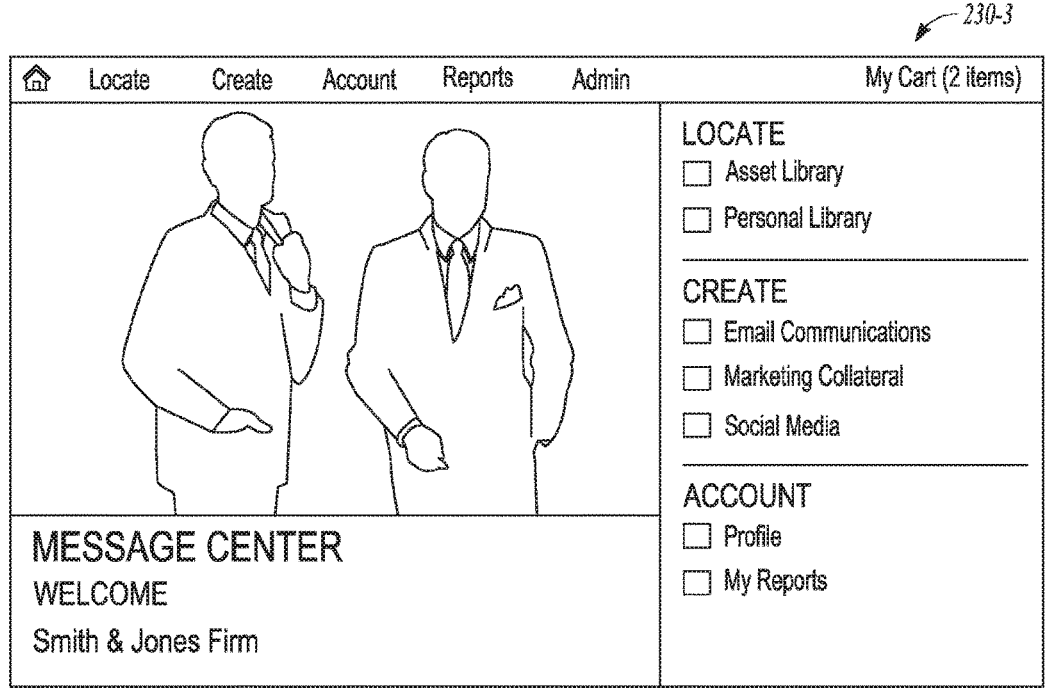
FIG. 1-3J1
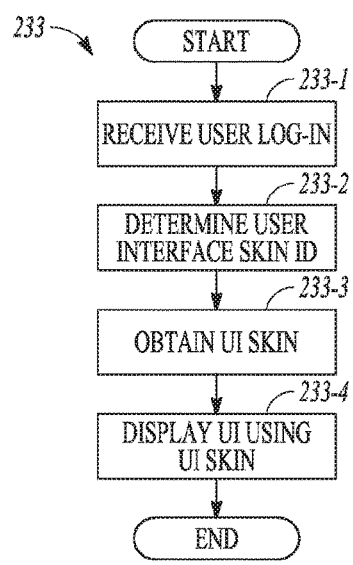
FIG. 1-3J2

COMPUTERIZED SHARING OF DIGITAL ASSET LOCALIZATION BETWEEN ORGANIZATIONS

PRIORITY

This Application is a U.S. National Stage Filing under 35 U.S.C. 371 from International Application No. PCT/US2014/041242, filed Jun. 6, 2014, which also the benefit of U.S. Provisional Patent Application 61/832,582 filed Jun. 7, 2013, U.S. Provisional Patent Application 61/833,795 filed Jun. 11, 2013, U.S. Provisional Patent Application 61/832,591 filed Jun. 7, 2013, U.S. Provisional Patent Application 61/833,826 filed Jun. 11, 2013, U.S. Provisional Patent Application 61/832,578 filed Jun. 7, 2013, and U.S. Provisional Patent Application 61/833,832 filed Jun. 11, 2013, all of which are incorporated by reference herein in their entirety.

TECHNICAL FIELD

This application relates generally to data processing within a network-based system, and more specifically to systems and methods for sharing digital assets, such as information or marketing assets, among organizations.

BACKGROUND

The creation and sharing of digital assets, for example information or marketing assets, can be a logistically challenging and/or inefficient activity for many organizations. These challenges and/or inefficiencies may be due to differences in the needs of the users for localization of the assets, due, for example, to differences in geographic locations, differences in the subject products or services, differences in channels, differences in branding requirements and/or differences in legal compliance requirements.

SUMMARY

A computerized system may receive digital assets and digital asset build rules from a plurality of organizations wherein some or all of the organizations can specify rules and information so that one or more localized digital assets can be generated for the particular needs of one of the respective organizations using one or more of the digital assets, and further wherein at least one of the localized digital assets is created using build rules specified by at least two different ones of the organizations.

BRIEF DESCRIPTION OF THE DRAWINGS

Some embodiments are illustrated by way of example and not limitation in the figures of the accompanying drawings in which:

FIG. 1-3A illustrates a simplified block diagram of a multi-organizational system 100 for creating, managing, sharing, publishing and/or distributing digital assets, according to one example embodiment.

FIG. 1-3B illustrates a process for building a localized digital asset, according to one example embodiment.

FIG. 1-3C illustrates a process used to build a localized digital asset by use of information obtained from various sources, according to one example embodiment.

FIGS. 1-3D-1 and 1-3D-2 illustrate multi-tenant aspects of the system disclosed herein, according to one example embodiment.

FIGS. 1-3E-1 to 1-3E-4 illustrate a digital assets library table, according to an example embodiment.

FIG. 1-3F illustrates database tables, for respective digital asset groups, according to an example embodiment.

FIG. 1-3G illustrates a database table of asset build rules specified by a Provider or Client Organization, according to an example embodiment.

FIGS. 1-3H to 1-3J-3 illustrate an example embodiment of a shared asset, multi-skin asset sharing system.

FIGS. 1-3K to 1-3M illustrate an example embodiment of various example configurations of the systems and methods described herein.

FIG. 1-4 illustrates and overview of system components according to an example embodiment.

FIG. 2 illustrates an environment for operating a mobile device, according to an example embodiment.

FIG. 3 is a block diagram illustrating a mobile device, according to an example embodiment.

FIG. 4 is a block diagram illustrating a network-based system for according to an example embodiment.

DETAILED DESCRIPTION

Figure 1:
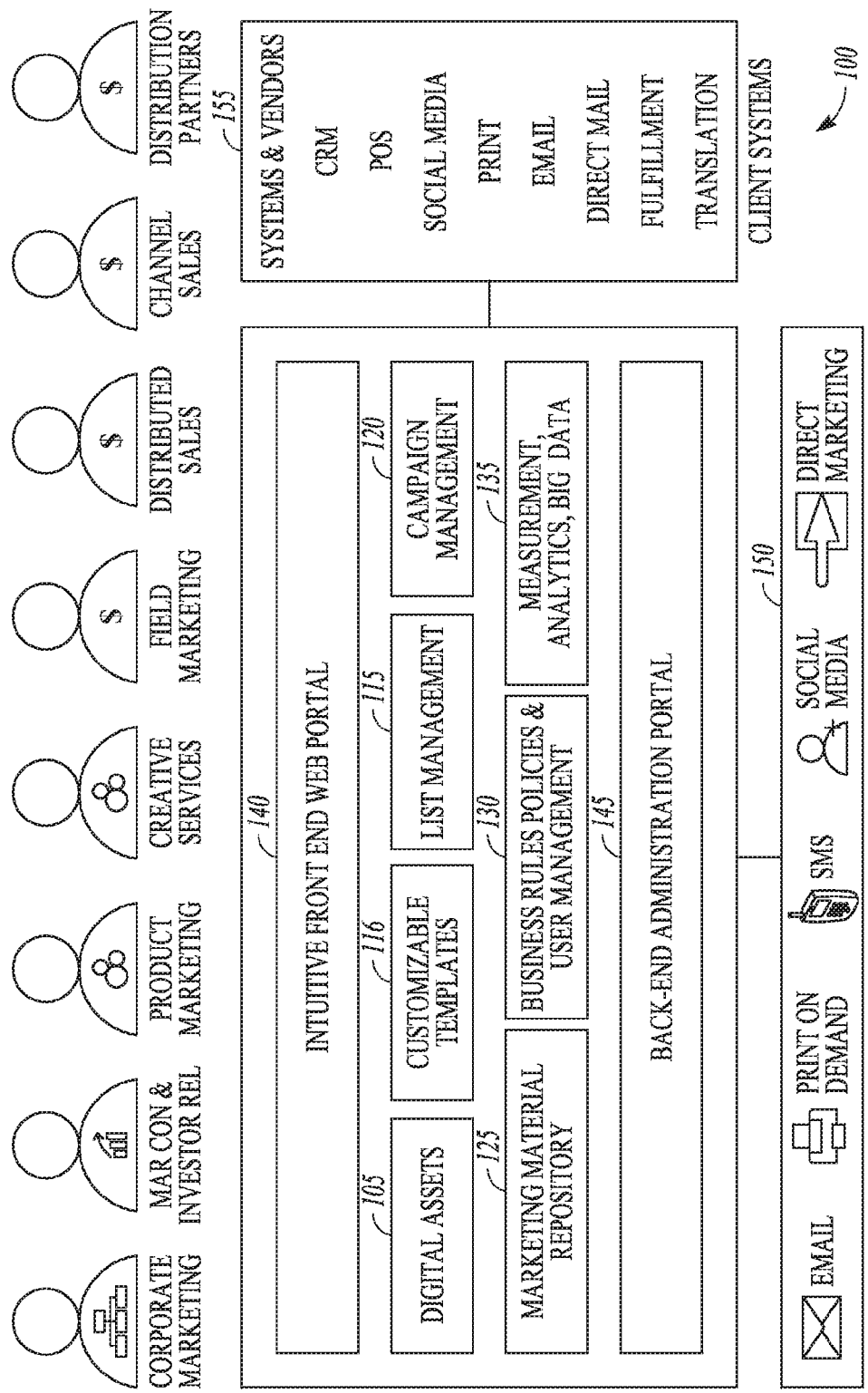
FIGS. 1-1, 1-2A and 1-2B illustrate an overview of digital asset sharing systems and methods, according to an example embodiment.

Example systems and methods for digital asset management are described. In the following description, for purposes of explanation, numerous specific details are set forth in order to provide a thorough understanding of example embodiments. It will be evident, however, to one skilled in the art that the present invention may be practiced without these specific details. It will also be evident that the digital asset sharing solutions described herein are not limited to the examples provided herein, and may include other embodiments not specifically discussed.

According to one example embodiment, there is described herein below a multi-skin, multi-organization, rights-based digital assets sharing system, for example used to share digital assets such as information or marketing assets. In one example configuration, an Information Provider Organization is a for-profit or non-profit publisher of information, such as an online information resource/database, that is in the business of supplying information to organizations such as the Client Organizations described herein. In this embodiment, the Information Provider Organization employs the system to provide a plurality of Client Organizations, such as law firms, accounting firms, or financial planners, with a digital assets delivery platform that allows the Client Organizations to "localize" the Information Provider Organization's digital assets for the Client Organization's use. Further, in one example embodiment, the Client Organizations may either access and use the Information Provider Organization's digital assets or manage and use "proprietary" digital assets introduced to the system by the respective Client Organization. The system, in one embodiment, is managed by the Information Provider Organization, which in turn may provision each Client Organization with its own account within the system. According to one embodiment, the Client Organizations account is provisioned with a custom user interface skin that displays the Client Organization's trademark, trade name and/or trade dress. Accordingly, the users from each Client Organization are provided the ability to view and use the Information Provider Organization's digital assets, and further to publish the Information Provider Organization's digital assets, or its own proprietary digital assets, localized with branding and other information specified by the Client Organization. Thus, each Client Organization has the ability to move between Information Provider Organization's digital assets or their own proprietary library of digital assets specific to their needs.

According to another embodiment, the system may optionally limit the sharing of Digital Assets only to "peer-to-peer" sharing, wherein there is no for-profit or non-profit Information Provider Organization that is engaged in the business of supplying content to other organizations (referred to herein also as a "commercial Information Provider Organization) such as the Client Organizations. Instead, in this embodiment, an entity other than an Information Provider Organization administers the system, and the Client Organizations alone provide Digital Assets to be shared with other Client Organizations, and to be localized by each respective Client Organization. In this capacity, each Client Organization acts as a "peer" information provider organization.

The following terms are used herein, and should be interpreted in accordance with the following definitions, the use of the terms in the specification following the definitions, and other definitions understood by those of skill in the art for the same term, provided that such other definitions that are not inconsistent with the definitions given herein.

Admin

Admin is a title given to users with Administrative capabilities in the Asset management and sharing system. Admins, in one example embodiment, have the ability to edit user permissions, utilize "Login As" functionality and have a greater level of access to digital assets of the Asset Library.

Asset

An asset is an umbrella term that refers to any digital file that can be used in internal or external communications efforts. Major types of Assets include text, image, PDF, video, audio, podcasts. Any major media file type (e.g., JPG, DOC, MPEG, etc) can be used as an asset. Assets are saved in and accessed from the Asset Library.

Asset Groups

Asset Groups, in one example embodiment, allow admin users to manage which sets of assets an Organization and/or user within an Organization is allowed to access when they customize emails or other materials. Organizations and/or Users can belong to one or multiple Asset Groups.

Asset Group Admin

Asset Group Admin functions, in one example embodiment, help manage how assets are stored and which Organizations or Users can access them. In one embodiment, a system or organization admin can add, remove or rename asset groups. An Asset Group can be created by an Information Provider Organization or, in one example embodiment, also be created by a Client Organization, either of which, respectively can specify which Client Organizations can access the Asset Group. Client Organizations can in turn specify which of their Users can access Asset Groups available to the Client Organization.

Asset Library

In one example embodiment, all assets are stored in the Asset Library.

Client ID

The client ID, in one example embodiment, is an optional informational assignment given to assets to assist in identifying and narrowing the search for assets.

Client Organization

In one example embodiment, a Client Organization is an organization provisioned by the Information Provider Organization in the system by which the Client Organization, for example, can share Digital Assets provided by the Information Provider Organization, or in an optional alternate embodiment, share Digital Assets with other Client Organizations.

Custom Dictionary

In one example embodiment, the Custom Dictionary allows a user to add words into the system that are specific to an Organization and may not be recognized in an English Dictionary. These words may be brand names or product offerings, etc. Adding them to the Custom Dictionary will streamline the spell check process for users.

Expiration Date

According to another example embodiment, users can activate and set expiration dates for any asset to determine when they will be accessible to users in the system.

Information Provider Organization

In one embodiment, the Information Provider Organization is an organization that publishes Digital Assets and, optionally, in one example embodiment, also administers the system for sharing Digital Assets, as described further herein.

Image Assets

Image Assets, are any files saved as images, for example for use in email or PDF customization. In one example embodiment, these assets may make up the sections of the Template Zones to which they are assigned. File types can include but are not limited to JPG, GIF, PDF, PNG and EPS.

Image Info

According to an example embodiment, Image Info displays basic information about the asset including its ID, Title, Content, expiration dates and Text Asset type. This Image Info may comprise the asset and determine how it is used in a template.

Keyword(s)

In one example embodiment, by default, keywords are be used in filtering both template options and Asset library searches. Keywords are assigned to assets to assist in organization and to simplify searching. Keywords are organized in groups to easily assign an asset to multiple related keywords.

Keyword Admin

In an example embodiment, assets may be assigned categories in Asset management and sharing system. Categories are then organized into keywords. Keywords make the search process easy, allowing users to find materials they're looking for quickly in the Asset library or while using a template. The Keyword Admin section may allow the admin to edit the categories and keywords.

Localize

In example embodiments, Digital Assets are customized to include Localizations such as, but not limited to, localizations desired due to differences in geographic locations, differences in the organizations using the Digital Assets, differences in the subject products or services, differences in channels, differences in branding requirements and/or differences in legal compliance requirements.

Login As

In another example embodiment, the Login As functionality allows an admin to login as a user to monitor activity, or operate the selected user's account as the user.

Multi-Tenant System

Multitenancy refers to a software architecture where a single instance of the software runs on a server, serving multiple client organizations (tenants). With a multitenant architecture, a software application is designed to virtually partition its data and configuration, and each client organization works with a customized virtual application instance.

Organization Hierarchy

In one example embodiment, the Organization Hierarchy refers to the user's place within the Organization tree of system permissions. For example, employees/users, in one example embodiment, are grouped beneath their supervisor. Groups may be nested hierarchically, meaning head of the organization is at the top of the hierarchy and subordinates follow according to rank.

Print Vendors

In one example embodiment, Print Vendor information is stored for use in Print-on-Demand orders for an Organization's preferred printers.

Template(s)

In one example embodiment, Templates serve as architectural patterns to assist in building communication pieces such as emails and PDFs. They provide a consistent foundational model with designated Template Zones into which various assets can be placed. Templates promote consistency between communication pieces by providing a limited number of specified, customizable variables.

Template Zone

In an example embodiment, each template has zones assigned to organize asset placement. You can assign assets to particular Template Zones, insuring that only relevant assets are available to users when customizing materials and emails.

Text Asset

In an example embodiment, Text Assets are any text materials. This includes headers, greetings and articles. These assets may be accessed by users in templates when customizing emails or PDFs to make up the pieces of the template zones to which they are assigned.

Text Type

In another example embodiment, Text Type identifies the nature/type of text of which a text asset is comprised. This can be any kind of text, including greetings, articles, headers, body copy, calls to action, secondary copy, etc. Text type assists in locating and placing the appropriate type of text in template zones.

User Admin

In an example embodiment, the User Admin function allows admins to edit or review system, asset, organization or user information, for example user roles, asset groups, the user's place in the Organization Hierarchy.

User Details/User Info

In one example embodiment, these personal and contact details may be used to populate fields in custom email and PDF templates.

User Interface (UI) Skin

In an example embodiment, the UI Skin describes or defines the aesthetic, visual, primarily cosmetic aspects of a UI, as opposed to functional elements, for example but not limited to graphical elements such as colors, fonts, formatting and brand elements such as trade names, trademarks or trade dress that alter the look and feel of the functional user interface elements. Skinning may be implemented with a model-view-controller architecture.

User Roles

In an example embodiment, each User in the system must be assigned a user role. This may determine their permissions and capabilities throughout the system.

Referring now to FIG. 1-1, there is illustrated an overview of a digital asset sharing system according to one example embodiment. System 100 includes one or more data structures and computer programs to hold, store, manipulate, display and otherwise use various kinds of data used to automate various digital asset management, authoring, localization, distribution, publication or other asset sharing or management tasks. In one example embodiment, data structures and programs are represented by data and modules that include digital assets in the form of information assets 105, such as marketing materials, customizable template module 116, list management module 115, campaign management module 120, marketing material depository module 125, business rules, policies, user management module 130, measurement, and analytics and big data module 135.

A front-end web portal 140 provides a graphical user interface for use by various constituencies, including corporate and product marketing personnel, creative services personnel, field marketing personnel, and personnel in distributed sales, channel sales and distribution partners. A back-end administration portal 145 provides access to systems administrators to provide a variety of system configuration functions, as explained herein below.

In addition, system 100 connects to a variety of services 150 used to distribute digital assets, such as information content or marketing assets, including e-mail, print on demand, SMS text, social media, and direct marketing services. Also, system 100 interfaces with various other systems 155 including customer relationship management systems, point of sales systems, social media systems, print systems, e-mail systems, direct mail systems, fulfillment systems and translation systems.

Figures 1, 2, 2A:
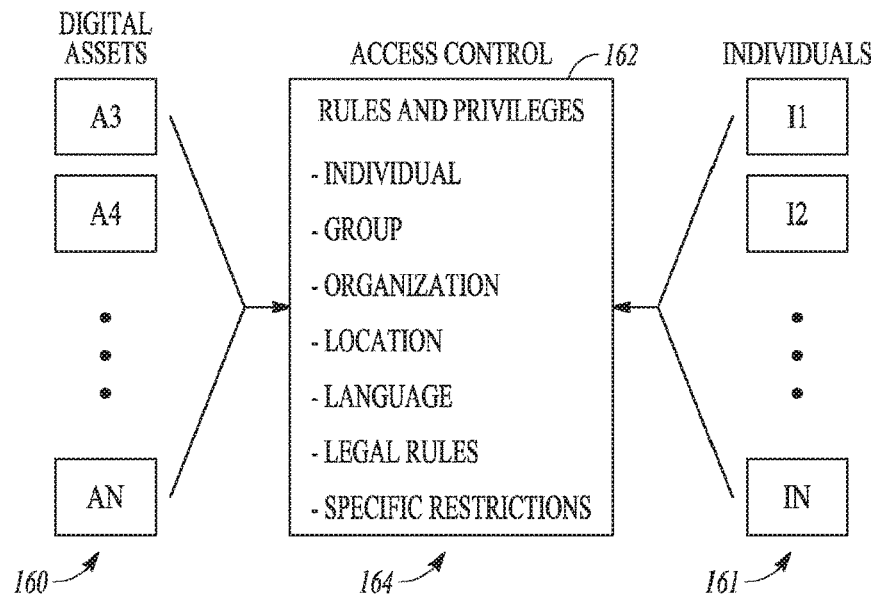

Referring to FIG. 1-2A, there is illustrated an overview of the asset management control applied to individual digital assets 160. Business rules and access privileges 162 are used to control access to assets 160 on multiple levels or dimensions 164, based on a defined organizational hierarchy, privileges of individuals in that hierarchy, the geographic location of an organization or user, language requirements, local legal rules and regulations, and/or specific restrictions applied to individual assets 160.

Figures 1, 2, 2B:
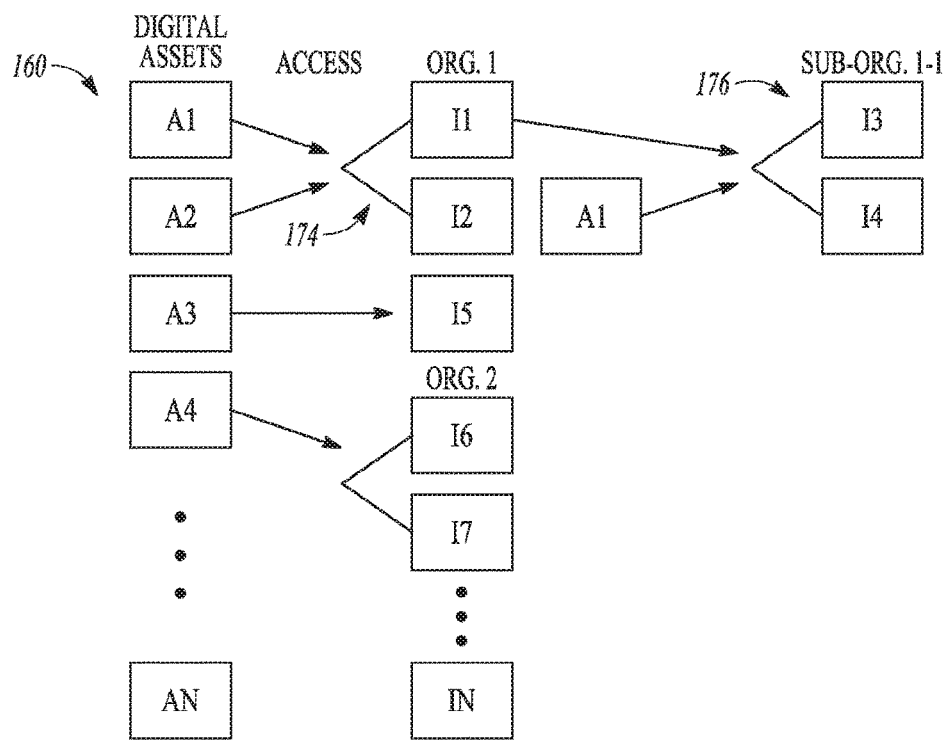

According to one example embodiment illustrated in FIG. 1-2B, the system 100 allows for multiple levels of administration of asset management, wherein a first administrative user may establish a group of individuals 174 in a first organization, one or more of which may in turn be authorized to establish one or more subgroups of users 176, and so on to create even lower levels of hierarchy. The privileges of each group and/or individual to use digital assets 160 in the system 100 may be specified. Accordingly, a first set of digital assets 160 for example assets A1 and A2, may be authorized for use by a first group as a whole, but only a portion of that authorization may be passed onto individual members of the group by a person responsible for managing the first group, for example, by individual I-1who provides access to asset A1. In addition, a member of the first group, having privileges to the first set of digital assets 160, may in turn create his or her own subgroup, and selectively pass the privileges to use individual ones of the first set of assets 160 to individual ones of that subgroup.

FIG. 1-3A illustrates a simplified block diagram of the system 100, according to an example embodiment, wherein at least one of a plurality of Organizations 201-1, 201-2, 201-3 . . . 201-n (collectively or individually referred to herein as Organizations 201), acts as an Information Provider Organization 201-1 and, in one example embodiment, is a publisher of digital assets 160, such as online information. In this example embodiment, for example, the Information Provider Organization 201-1 may provision Client Organizations 201-2, 201-3, et seq. (collectively "Client Organization(s) 201-2") with rights to use system 100, herein referred to as an "account" within the system 100, and authorize such Client Organizations 201-2 to access and/or use digital assets 160 introduced by the Information Provider Organization 201-1. These digital assets 160, in one example embodiment, are stored in a data storage system as described further below, and are organized into a plurality of Asset Groups 202-1, 202-2, 202-3 . . . 202-n (collectively or individually referred to as Asset Groups 202). In another example embodiment, Client Organizations 201-2 are not tenants within the system 100, but share an account with the Information Provider Organization 201-1. In still another example embodiment, an organization or user other that the Information Provider Organization 201-1 administers the system 100, for example to provision Information Provider Organizations 201-1 or Client Organizations 201-2.

According to another example embodiment, the Client Organizations 201-2 may also introduce their own proprietary digital assets 160 into system 100, which may be stored in one or more of the Asset Groups 202, and use those assets on a proprietary basis. Accordingly, in one example embodiment, the Client Organization 201-2 may thus either use digital assets 160 provided by the Information Provider Organization 201-1, or use their own proprietary digital assets 160. In yet another example embodiment, Client Organizations 201-2 may also share its own proprietary digital assets 160 with other Client Organizations 201-2.

Accordingly, in one example embodiment, one or more of Asset Groups 202 contains digital assets 160 provided by the Information Provider Organization 201-1, and other Asset Groups 202 contain proprietary digital assets 160 provided by the Client Organizations 201-2. The Information Provider Organization 201-1 in this example embodiment may be a for-profit or non-profit digital assets 160 publishing organization such as, but not limited to, a publisher of scientific, business, legal, or medical data. Such information or data may, in some but not all example embodiments, be sold or licensed, for example, on a for-profit or non-profit basis, using a business-to-consumer or business-to-business distribution model. For example, the publisher may publish or distribute legal information such as treatises, statutes, case, case notes and legal analysis. According to still another example embodiment, Client Organization 201-2 may be a professional organization such as a private practice law firm or law department in a corporation.

An Access Rights module 204, in one example embodiment, maintains access rights data, described in more detail below, that specifies the permitted access and uses by individuals in each of the Client Organizations 201-2, such as administrators or end users of the digital assets. An Asset Template Module 205 maintains Template data, described in more detail below, that specifies Templates to be used to assemble assets for use Organizations 201. An Asset Build Rules Module 206 maintains build data and rules that include, for example, rules specified both by an Information Provider Organization 201-1 and by a Client Organization 201-2.

An Asset Build Module 207, in one example embodiment, receives requests for assets from users at one or more of the Client Organizations 201-2, and, using information obtained from the Access Rights Module 204, Asset Template Module 205 and Asset Build Rules Module 206, performs the process illustrated in FIG. 1-3B-1: 1) determines 209-1 which assets the user has rights to access, and optionally, what operations or uses the user may perform on or with the asset, 2) identifies 209-2 the rules and data to be used to build a localized digital asset (e.g., an asset 160 that is ready for use), 3) identifies 209-3 the template specified to be used to build the localized asset, 4) builds 209-4 the localized digital asset, and 5) displays 209-5 the localized digital asset 210 to the user at the respective Client Organization 201-2, who in turn may use the asset 160 as permitted. According to one example embodiment, as illustrated, the localized digital asset 210 includes digital assets 210-1 retrieved from the asset library, template structure 210-2 retrieved from the Template Module Data, brand or other information variables 210-3 specified by an Information Provider Organization 201-1 (also referred to as a "provider" in FIGS. 1-3B and 1-3C) and/or by a Client Organization 201-2, that may use or "consume" one or more of the digital asset 160 and the localized digital asset 210 (also referred to as a "consumer" in FIGS. 1-3B and 1-3C) in the asset build rules. Accordingly, in one embodiment, the localized digital asset 210 is formed using a digital asset 160 from the asset library that is at least in part "non-localized." This digital asset 160 is then "localized" (or further localized if the asset 160 already has some localization) with branding and/or other information specified by the Information Provider Organization 201-1 and/or the Client Organization 201-2, such that the digital assets 160 from the asset library. In one example embodiment, the digital assets 160 provided by the Information Provider Organization 201-1 may have no localization, and all localization is provided by the Client Organization 201-2.

In one example embodiment, where the localized digital asset 210 is introduced into system 100 by the Client Organization 201-2, the digital assets 160, templates and build rules may be provided entirely by the Client Organization 201-2, such that localization of the digital asset 160 is entirely or primarily defined by the Client Organization 201-2. Alternatively, digital assets 160 introduced into system 100 by a Client Organization 201-2 may be localized using at least some templates or build rules provided by the Information Provider Organization 201-1.

For example, as illustrated in FIG. 1-3C, the process outlined above may be used to build a localized digital asset 210 by combining 214 a non-localized (or at least partially non-localized) digital asset 210-1 (e.g., the digital asset 160), contributed by either an Information Provider Organization 201-1 or Client Organization 201-2 (termed a "provider Organization" in some references herein), and kept in an asset library (discussed further below), with Template information 210-2 and with brand or other information 210-3 specified by build rules specified or adopted by an asset consuming Client and/or an Information Provider Organization 201-1. According to another example embodiment, the Client Organization 201-2 or Information Provider Organization 201-1 may specify both the Template information and the build rules.

According to one example embodiment, the provider Organization has administrator access to system 100 to specify combinations of digital assets 160, asset templates, and build rules, wherein the provider Organization may specify assets that are to be used by a Client Organization

201-2. Moreover, the Client Organization 201-2, in one embodiment, has access to administrator functions on system 100 to specify rules on how to add additional localization information variables to an asset, such as adding the Client Organization's 201-2 branding information or other information. For example, in the case the Client Organization 201-2 is a service firm, such as a law firm, the firm may establish rules that specify a firm name and/or logo to be added to an asset, and/or for example contact information for the firm, and/or for example legal notices that may be advisable or required by applicable ethics rules or consumer protection laws. According to one example embodiment, the Information Provider Organization 201-1 may establish a template that includes its desired brand information in the template, or it may add brand or other information to a template using build rules it specifies.

Referring now to FIG. 1-3D-1 and FIG. 1-3D-2, there is illustrated an example embodiment of system 100 with multi-tenant capabilities. As shown in the example embodiment of FIG. 1-3D-1, system 100 is configured to provide access to Organizations 201 using a software as a service (SAAS) model. In one example embodiment, the Information Provider Organization 201-1 administers a multi-tenant embodiment of system 100 and provisions and administers tenant accounts 211-1 . . . 211-n in the system 100 for each Client Organization 201-2. In this example embodiment, each Client Organization 201-2 has its own tenant account, and the Information Provider Organization 201-1 shares its digital assets 160 with the Client Organizations 201-2 from its own tenant account to the respective tenant accounts of the Client Organizations 201-2.

In an alternate embodiment, the Information Provider Organization 201-1 and the Client Organizations 201-2 share a single tenant account, and each Client is provisioned as a sub-organization so that the Information Provider Organization's 201-1 digital assets 160 are shared within a single tenant account with the Client Organizations 201-2. In this embodiment, multiple Information Provider Organizations 201-1 may each administer their own tenant account and in turn provision Client Organizations 201-2 as sub-organizations within their own tenant account.

In either of the above configurations, Information Provider Organization 201-1 or Client Organizations 201-2 may have respective members and users, such as their employees or agents, who are registered as users in the respective tenant account. Each member has a profile that determines, at least in part, the rights the user has to access and work within the respective tenant account 211, and in turn with the data 213 in data storage system 203. Data 213 may be digital assets 160 made available to it by an Information Provider Organization 201-1, or in an alternate embodiment, also by another Client Organization 201-2 within the same tenant account or in another tenant account, depending on the configuration.

Various database tables are used, in one example embodiment, to enable or perform the various software functions and processes described herein. Referring now to these tables, FIG. 1-3E-1 illustrates a user profile table 219 in a database according to an example embodiment. User profiles are identified in the table 219 by a User ID, a name for the user, the Organization ID for the Organization the user belongs to, and user profile information such as but not limited to access rights for the user, rights with respect to use of specific assets 160 or functions of the system 100, and other user-specific information.

FIG. 1-3E-2 illustrates a digital assets library table 220 in a database according to an example embodiment. Assets 160 are identified in the table 220 by an Asset ID, and the table identifies an Organization 201, using an Organization ID, that is the asset provider (e.g., either an Information Provider Organization 201-1 or a Client Organization 201-2) for the asset 160, a title for the asset 160, a storage location for the asset 160, the Groups that the asset 160 has been assigned to, and other asset information as necessary or optional.

FIG. 1-3E-3 illustrates a template table 221 in a database according to an example embodiment. Templates are identified in the table 221 by a Template ID, a name for the template, a storage location for the template, and other template information as desired.

FIG. 1-3E-4 illustrates a user interface (UI) skin table 225 in a database according to an example embodiment. UI skins are identified in the table 217 by a UI skin ID, a name for the skin, the Organization ID of the organization for which the skin is to be used (or alternatively, skins may be assigned to specific users), a storage location for the skin, and other UI skin information as desired.

FIG. 1-3F illustrates database tables 250-1 to 250-n, for respective digital asset groups 202 according to an example embodiment. Each asset Group table specifies one or more digital assets 160, identified by an Asset ID, that are within the Group. For each asset 160 in the Group, there is indicated the Provider or owner of the asset 160, which Organizations 201, and in turn their respective users, that are permitted access rights to the assets 160 in the Group, and optionally, the rights that each Organization 201 has to use the respective asset 160 they have access to. As illustrated further below, an Organization 201 is provided an administrative interface through which to create Groups of assets 160 from an asset library created by or accessible to the Organization, for example assets 160 added to the library by the Organization. As noted, in various embodiments, the Information Provider Organization 201-1 may be the only provider of digital assets 160 to be shared and/or used in the system 100, or Client Organizations 201-2 may also contribute digital assets 160 to be shared and/or used in the system 100.

FIG. 1-3G illustrates a database table 222 of asset build rules specified by a Provider of the digital assets 160, such as an Information Provider Organization 201-1 or a Client Organization 201-2, according to an example embodiment. Build rules may include a set of rules and information variables for each asset 160 in a Group made available to users in Organizations 201. Such rules and information specify, for example, a Template to be used for the asset 160, wherein the Template may be the same for all Organizations using the asset 160, or the rule may specify different Templates depending on the Organization of the user using the asset 160. Further, the rules may specify branding or other information for building the asset 160, such that this information may be applicable to all users no matter which Organization they are in, or such that this information is specific to the users in a particular Organization only. As such, the asset build rules provide an Organization the ability to localize an asset 160 for use by its own users in a first way, localize it for users of a different Organization in another way, and localize it for yet another different Organization in still another different way. Furthermore, the rules are in no way limited to these examples. For instance, the rules may further specify different asset builds for users not only based on their Organization, but also based on their location or other attributes of the user, such as a user's expertise level.

Build rules may also include a set of rules and information for each asset 160 in a Group made available to users in the Client Organization 201-2. According to one example embodiment, the Template for the build is specified by the Organization providing the asset 160, and the Client Organization 201-2 using the asset 160 defines rules for branding or other information to be added to the Template, in a Template Zone, to build the asset 160. In one embodiment, such rules or information are applicable to all users in the Client Organization 201-2, or optionally, such that this information is specific to particular users only. As such, the asset build rules provide the Client Organization 201-2 the ability to add additional localization information. Furthermore, the rules are in no way limited to these examples. For instance, the rules may further specify different asset builds for users not only based on their Organization, but also based on their location or other attributes of the user, such as a user's expertise level. Alternatively, the Organization providing the asset 160 may allow the Client Organization 201-2 to specify a Template to be used for the asset 160, and for some of the localization information for the template to be created based on build rules established by the Organization providing the asset 160 for use by the another Organization.

Referring now to FIG. 1-3H to 1-3J, there is illustrated an example embodiment wherein the Information Provider Organization 201-1 of the system 100 is a legal information provider, dubbed the "Legal Content Company" in the illustrations. FIG. 1-3H illustrates a user interface with a skin 230-1 that is presented to the Legal Content Company. FIG. 1-3I illustrates a UI view into an organizational hierarchy wherein groups of users, within one or more Organizations, are afforded access to a digital assets library provided the digital assets company are organized by region 230-2, for example countries, territories, states and provinces. In the example embodiment, under the state of Minnesota, there is illustrated a Group of users belonging to the Smith & Jones firm, and also a Group called Real Estate Lawyer. The UI of FIG. 1-3J-1, there is illustrated a UI skinned 230-3 for the Smith & Jones firm. In this example, the Smith & Jones firm may act as a user organization, using digital assets 160 localized in accordance with templates and rules specified by the digital assets provider company that provides digital assets 160 to various user organizations such as the Smith & Jones firm, and also localized with brand or other information based on build rules specified by the Smith & Jones firm, or, in an alternative embodiment, also using templates specified by the Smith & Jones firm.

Further, as also illustrated in the above described UI, and FIG. 1-3J-2, is dependent on the Organization to which the user belongs. As for example illustrated in the process 233 of FIG. 1-3J-2, the UI skin 230-1 or 230-3 is determined by system 100 by first receiving 233-1 the login credentials for a user, next determining the UI skin ID for the user, based on the Organization to which the user belongs, for example as determined from table 217, and determining 233-2 the skin for that Organization from the table 1-3E-4, obtaining 233-3 the skin information from data storage, and then generating 233-4 the UI skin to present to the user, for example in this example, a UI skin that shows the branding for the Smith & Jones firm, or the Information Provider Organization 201-1 skin for a user logging in with that skin specified. For example, as illustrated in FIG. 1-3J-3, users 1, 2, . . . n, from respective Organizations 1, 2, . . . n, are each presented with a different UI skin 1, 2, . . . n, respectively, in the event that each Organization has its own unique skin, as determined by the process 233, which in one example embodiment is implemented using a computer program executing in the system 100.

Accordingly, as described above, and as shown in FIGS. 1-3K, 1-3L and 1-3M, there is provided a system 240 that, in one embodiment shown in FIG. 1-3K, is configured such that an Information Provider Organization 201-1, such as a commercial provider, that may also optionally administer and host the system, introduces digital assets 160 into the system 100, and Client Organizations 201-2, and in particular in one embodiment organizations that are peers of one another, are allowed to localize those assets 160 for their own use. For example, the peer Client Organizations 201-2 may all be law firms or accounting firms or any other type of organization that would have a common interest in a particular type of digital asset 160 to use in its business. In one configuration of the embodiment of FIG. 1-3K, only the Information Provider Organization 201-1 is allowed to share digital assets 160 with the Client Organizations 201-2, and the Client Organizations 201-2 may establish their own build rules and templates for localization of the digital assets 160.

Alternatively, in another embodiment illustrated in FIG. 1-3L, the system is configured without a host Information Provider Organization 201-1, and is operated only with peer Client Organizations 201-2 that both introduce digital assets 160 into the system for their own use and localization, and optionally as well share their own assets 160 with other peer Client Organizations 201-2, who may localize the shared digital assets 160 from other peer Client Organizations 201-2 for their own use.

Or, alternatively, in another embodiment shown in FIG. 1-3M, the system 100 is configured to allow both the Information Provider Organization 201-1, such as a commercial provider, and the peer Client Organizations 201-2 to introduce and share digital assets 160 with the other Organizations.

In another example implementation of FIGS. 1-3K, 1-3L and 1-3M, the Client Organizations 201-2 are only partially peers of one another in the sense that their interest in the digital assets 160 may only partially overlap, or not be in the same industry or business, but nonetheless share an interest in the same type of digital assets 160.

Further, for example as described above with respect to in FIGS. 1-3B and 1-3C and elsewhere herein, the localization of a digital assets 160 may be performed using build rules specified by one or both of the user of the Digital Asset or the provider of the digital assets 160, to provide shared control over localization of a digital asset 160 between multiple Organizations. Accordingly, either or both of the Organizations may specify the template or localization criteria or content for the digital assets 160 being localized.

Referring to FIG. 2, there is illustrated an overview of an example embodiment of various modules of the system 100 that may be used to set up and maintain the system data structures and configuration required to support the various functions of the system for users. Modules 180 to 193 accordingly provide both computer program instructions that are executed on a computer platform such as those described in more detail below, and data structures to organize and store data created by or loaded into the system by users, such as configuration data or asset data, such as digital assets 160.

A User Manager module 180, according to one example embodiment, allows a user to browse a list of all users or search by their first or last name, and to add, delete or edit users, including the following methods and functions: i) locate the desired user in the User Directory; ii) view their User Details; iii) edit User Details; iv) delete a User; v) add a new user; and/or vi) assign a Login/User Name and a Password.

A Profile Manager Module 182, according to one example embodiment, displays basic contact information about a user, and allows for entry or edit of profile information. These details may be used to populate fields in custom email and PDF templates. According to one example embodiment, up to three personal images or logos may also be uploaded for use in selected templates. According to one example embodiment, the Profile Manager Module has a configurable localization setting for each user that allows the administrator to set the language for the user. When the user logs in, the system automatically changes the GUI on either the back-end portal or the front-end portal, depending on which interface the user is accessing, to the language/localization setting for that user.

Asset Groups module 183, according to one example embodiment, allows a user to manage which sets of digital assets 160 a user is allowed to access. Users may belong to one or multiple Asset Groups 202. An admin user, for example, may assign which Asset Groups 202 should have access to this digital assets 160. Module 183 also allows for adding a user to an Asset Group 202, for example by granting the user access to the desired group. In addition, this module and corresponding GUI also allows Admin Users to assign Users access to functionality for the specified Asset Groups 202. For example, according to one example method, the user may be granted or denied rights to: i) download or order digital assets 160; ii) customize Email or materials/digital assets 160; iii) manage their Address Book or Profile; and/or iv) post to Social Media channels.

Assign Admin Rights module 185, according to one example embodiment, manages admin rights and controls access to specific functionality. For example, the following rights, are available to be assigned: i) managing the Asset library, Template Assets, Keywords and Asset Groups 202 for the specified Asset Groups 202; ii) grant a user access to login as another user, the rights to run drilldown/summary reports, manage print vendors and manage the hierarchy; iii) additional permissions allow a user to manage the Message Center (on the Home screen), manage the Custom Dictionary, and manage Asset Specific Vendors; and/or iv) the right to grant users the same admin rights to others users in their hierarchy.

Print Vendor Admin module 186, according to one example embodiment, has the ability to add or edit Print Vendor information stored in the system for user orders.

Asset Group Admin module 187, according to one example embodiment, is an organizational function to help manage how a user's digital assets 160 are stored and who may access them. This module allows an Organization admin to add, remove or rename the system asset groups 202.

Keyword Admin module 188, according to one example embodiment, provides that digital assets 160 are assigned categories in the system, and then organized into keywords. Keywords assist with the search process in the Asset Library or sorting of digital assets 160 within a customizable template. By default, keywords may be used in filtering both template options and Asset Library searches. A Template Only preference may be set to allow a user to determine if a keyword or keyword category may only be used when filtering digital assets 160 used in a template—meaning they will not be available in the Asset Library.

The Asset Library Admin module 189, according to one example embodiment, allows admin users to manage digital assets 160 accessed by users in the Asset Library. A user may search by Title, Client Item ID, Asset Groups 202, Categories or Expiration Date. Asset Details contains all of the asset's digital assets and settings. This information assists the System with the management of the digital asset 160. New digital assets 160 may also be added by the module 189. When adding a new digital asset 160, a user, in one example embodiment, assigns all details of the digital asset 160. Also, a user may delete the digital asset 160—if it has not been used in a template. Digital assets 160 information may include, in one example embodiment, basic information about the digital assets 160 including its an Asset ID, Title, Description, expiration dates, and download availability. The asset 160 start and expiration dates may be used to determine when the digital assets 160 will be accessible by setting a start or expiration date.

The Text Admin module 190, according to one example embodiment, manages Text Assets which includes headers, greetings, articles, and body copy. When customizing emails or PDFs, these digital assets 160 may be accessed by users in templates. The following example functions and methods are provided for this purpose: i) a search filter allows a user to search by Title, Asset ID, Asset Groups 202, Templates, Categories and Expiration Date; ii) asset details may be displayed and/or edited; iii) new digital assets 160 may be added; iv) digital assets 160 may be deleted; v) a digital asset 160 may be associated with a public URL or an Asset Library URL; vi) a digital asset 160 may be linked to other digital assets 160 already stored in the Asset Library. For example, a user may want to connect a specific article or white paper with a user's email headline or paragraph of text—this may help provide a particular digital asset 160 to be included with a user's text asset, as a link to the PDF; vii) a user may manage the templates where the text asset will be used; viii) a user may assign digital assets 160 to particular Template Zones, insuring that only relevant digital assets 160 are available to users when customizing materials; and ix) keywords may be associated with each digital assets 160.

The Image Admin module 191, according to one example embodiment, controls Image Assets, which are any files for use in email or PDF customization. These digital assets 160 make up components of customizable templates to which they are assigned. The following example functions and methods are provided for this purpose: i) search for a digital asset 160 by Title, Asset ID, Asset Groups 202, Templates, Categories and Expiration Date; ii) viewing or editing an image asset; iii) adding or deleting an Image asset; iv) display, add or edit basic information about the digital assets 160 including its ID, Title, Content, Expiration Date and Text Asset Type (this Image Info may comprise the digital asset 160 and determine how it is used in a template); v) manage the templates that the Image Asset will be used in, for example assign an image asset to particular Template Zones, insuring that only relevant digital assets 160 are available to users when customizing materials; vi) assign which Asset Groups 202 should have access to this digital asset 160; vii) assign the keywords associated with each image asset.

The Organization Hierarchy module 192, according to one example embodiment, manages a list of users grouped the way they are structured in the organization. The hierarchy is beneficial for Reporting and Login—as structure. The following example functions and methods are provided for this purpose: i) create/edit Hierarchy, wherein the Hierarchy allows a user to establish the organizational structure where users will be assigned.

The Custom Dictionary module 193, according to one example embodiment, allows a user to add words into the system that are specific to a user's organization and may not be recognized in an English dictionary. These words may be brand names, product offerings, etc.

Example Operating Environment

FIG. 2 is a block diagram illustrating an environment 300 for operating a mobile device 400, according to an example embodiment, for deploying and/or implementing the digital asset 160 sharing system and methods described herein. The mobile electronic device 400 may be any of a variety of types of devices, for example a cellular telephone, a personal digital assistant (PDA), a Personal Navigation Device (PND), a handheld computer, a tablet computer, a notebook computer, or other type of movable device. The device 400 may interface via a connection 310 with a communication network 320. Depending on the form of the mobile electronic device 400, any of a variety of types of connections 310 and communication networks 320 may be used. The device 400 may further interface with a satellite 370 via a link 360.

For example, the connection 310 may be Code Division Multiple Access (CDMA) connection, a Global System for Mobile communications (GSM) connection, or other type of cellular connection. Such connection 310 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology. When such technology is employed, the communication network 320 may include a cellular network that has a plurality of cell sites of overlapping geographic coverage, interconnected by cellular telephone exchanges. These cellular telephone exchanges may be coupled to a network backbone, for example, the public switched telephone network (PSTN), a packet-switched data network, or to other types of networks.

In another example, the connection 310 may be Wireless Fidelity (Wi-Fi, IEEE 802.11x type) connection, a Worldwide Interoperability for Microwave Access (WiMAX) connection, or another type of wireless data connection. In such an embodiment, the communication network 320 may include one or more wireless access points coupled to a local area network (LAN), a wide area network (WAN), the Internet, or other packet-switched data network.

In yet another example, the connection 310 may be a wired connection, for example an Ethernet link, and the communication network may be a local area network (LAN), a wide area network (WAN), the Internet, or other packet-switched data network. Accordingly, a variety of different configurations are expressly contemplated.

A plurality of servers 330 may be coupled via interfaces to the communication network 320, for example, via wired or wireless interfaces. These servers 330 may be configured to provide various types of services to the mobile electronic device 400. For example, one or more servers 330 may execute location based service (LBS) applications 340, which interoperate with software executing on the device 400, to provide LBS's to a user. LBS's may use knowledge of the device's location, and/or the location of other devices, to provide location-specific information, recommendations, notifications, interactive capabilities, and/or other functionality to a user. Knowledge of the device's location, and/or the location of other devices, may be obtained through interoperation of the device 400 with a location determination application 350 executing on one or more of the servers 330. Location information may also be provided by the device 400, without use of a location determination application, such as application 350. In certain examples, the device 400 may have some limited location determination capabilities that are augmented by the location determination application 350. The servers are coupled to database 390, which includes point of interest files 392, user place files 394, and location history files 396.

Example Mobile Device

Figures 1, 2, 3, 3A:
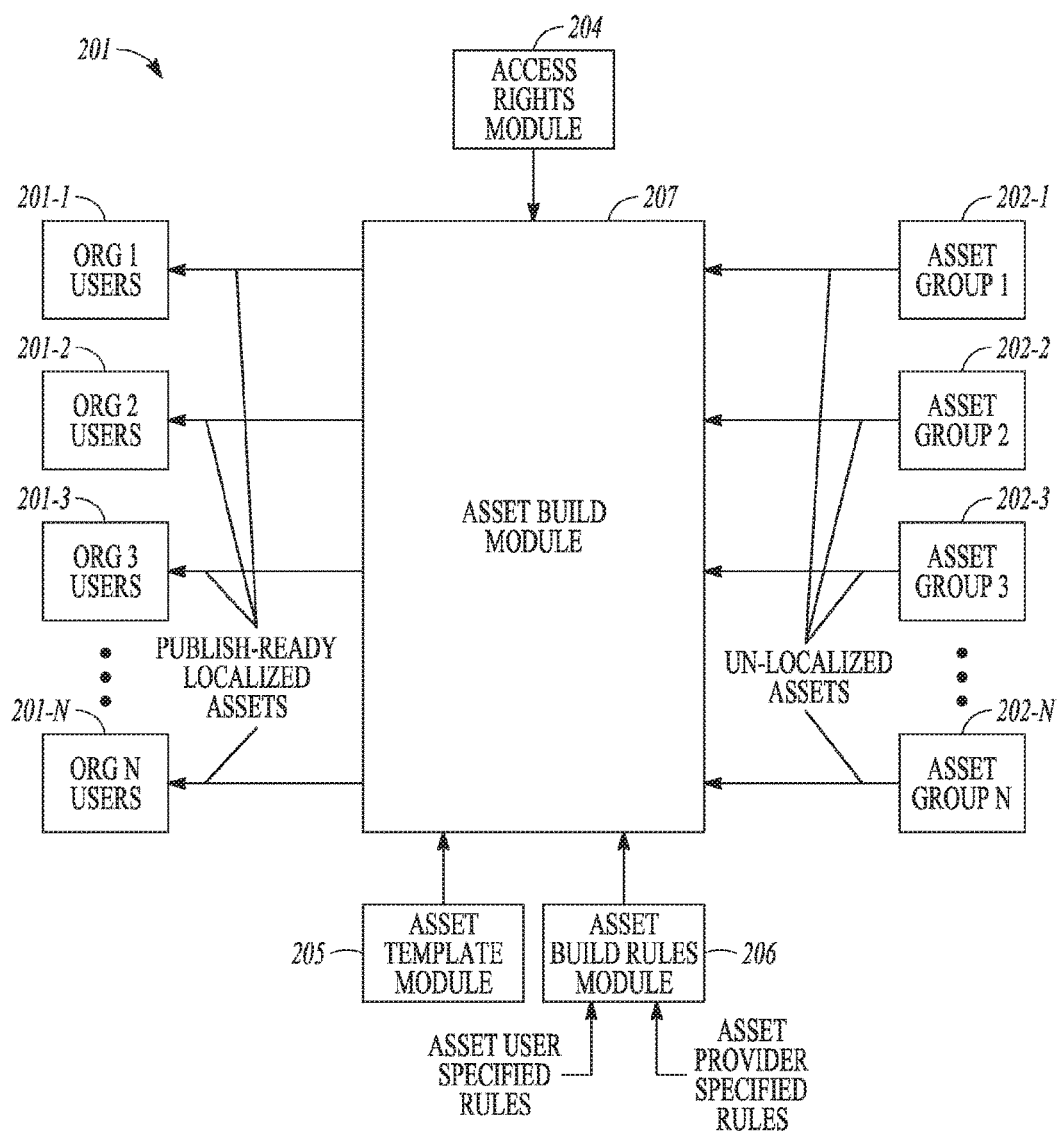
Figures 1, 2, 3, 3B:
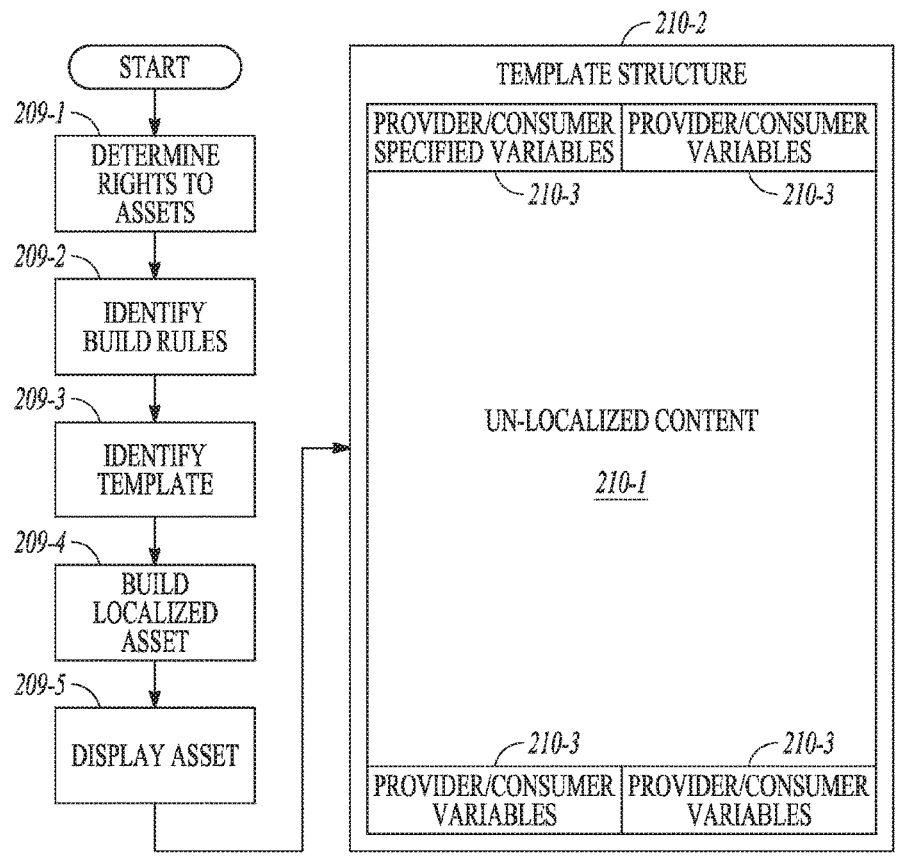
Figures 1, 2, 3, 3C:
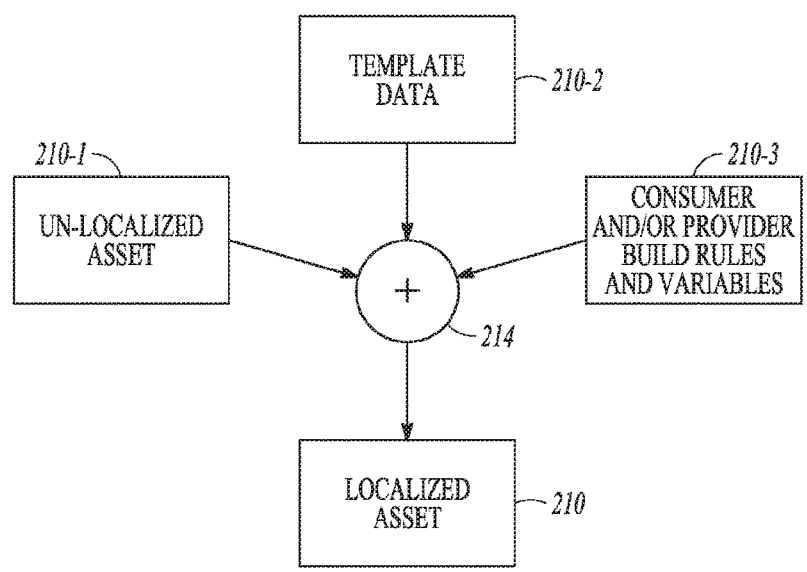
Figures 1, 2, 3, 3D:
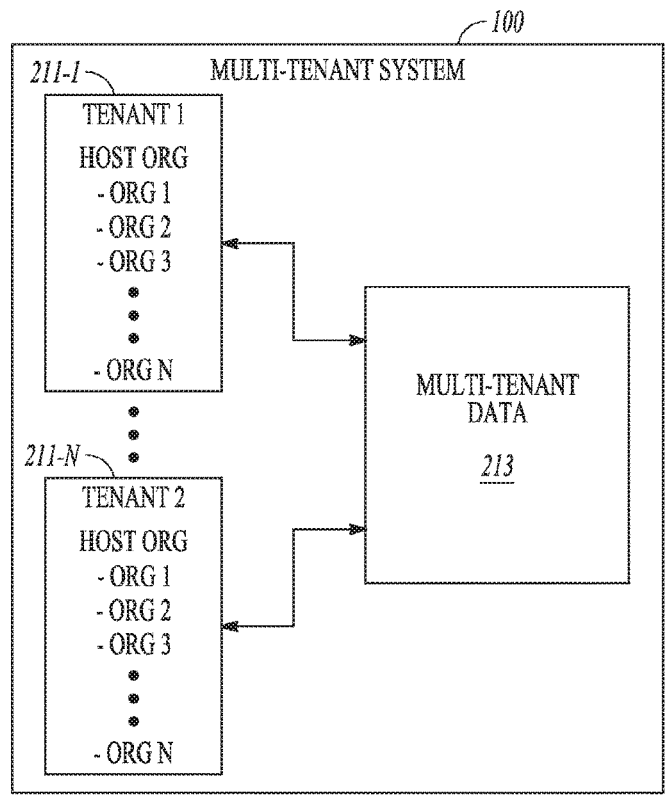
Figures 1, 2, 3, 3D:
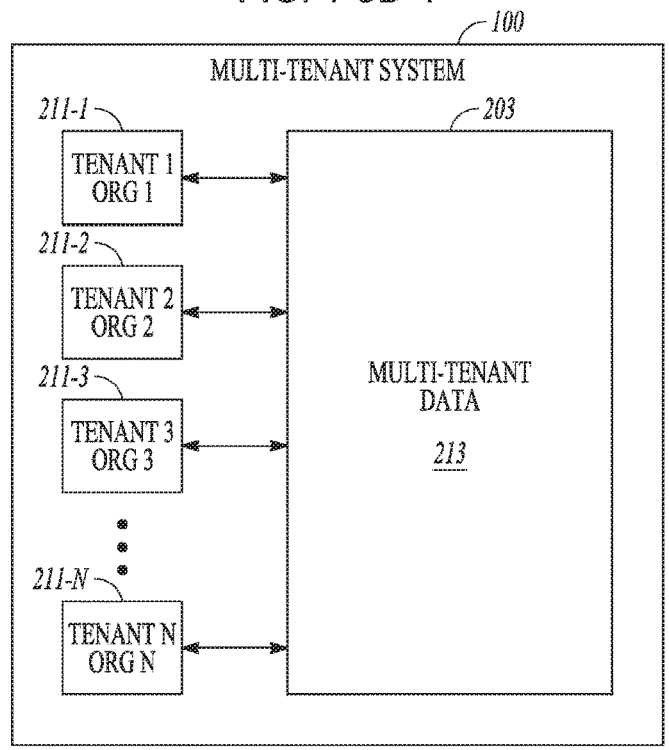
Figures 1, 2, 3, 3H:
Figures 1, 2, 3, 3I:
Figures 1, 2, 3, 3J:
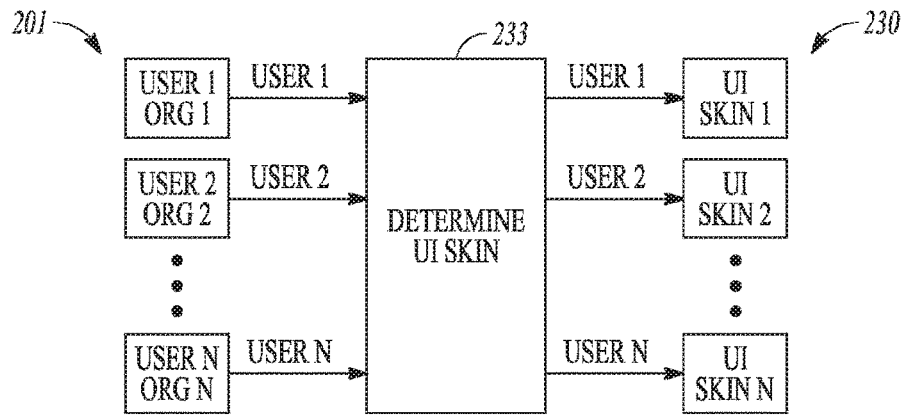
Figures 1, 2, 3, 3K:
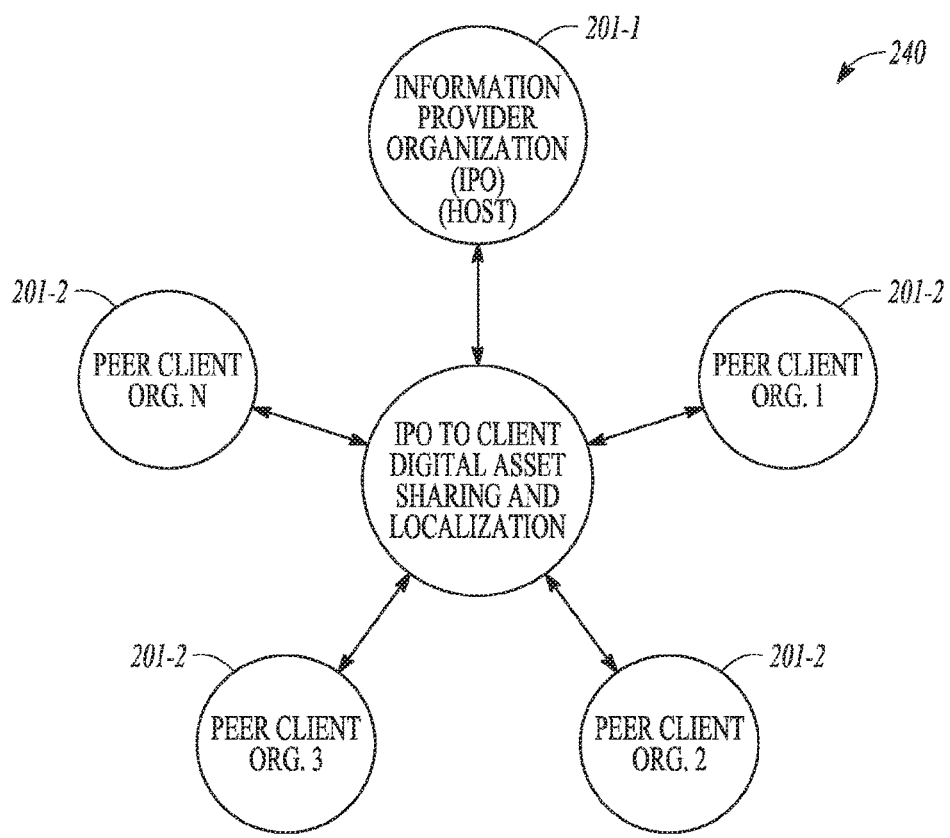
Figures 1, 2, 3, 3L:
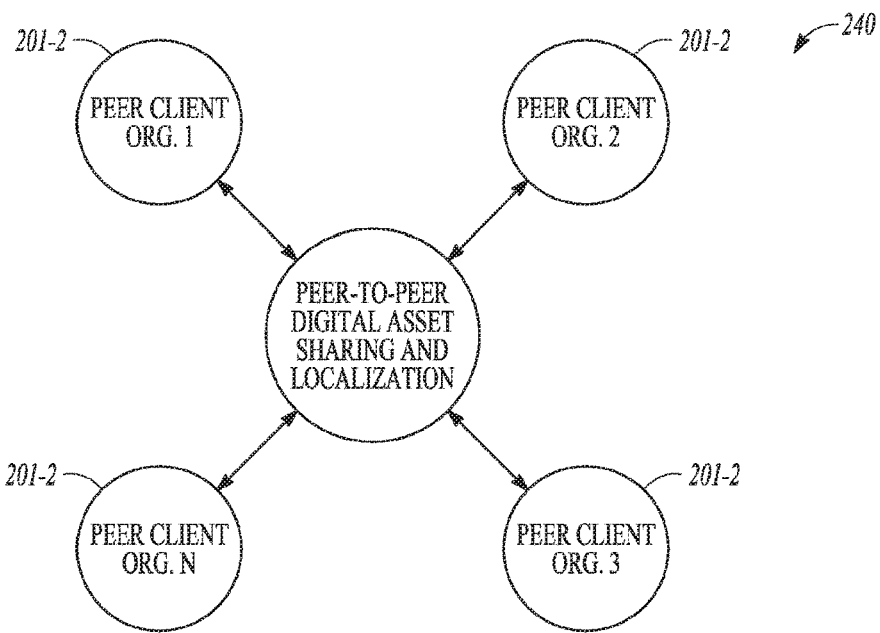
Figures 1, 2, 3, 3M:
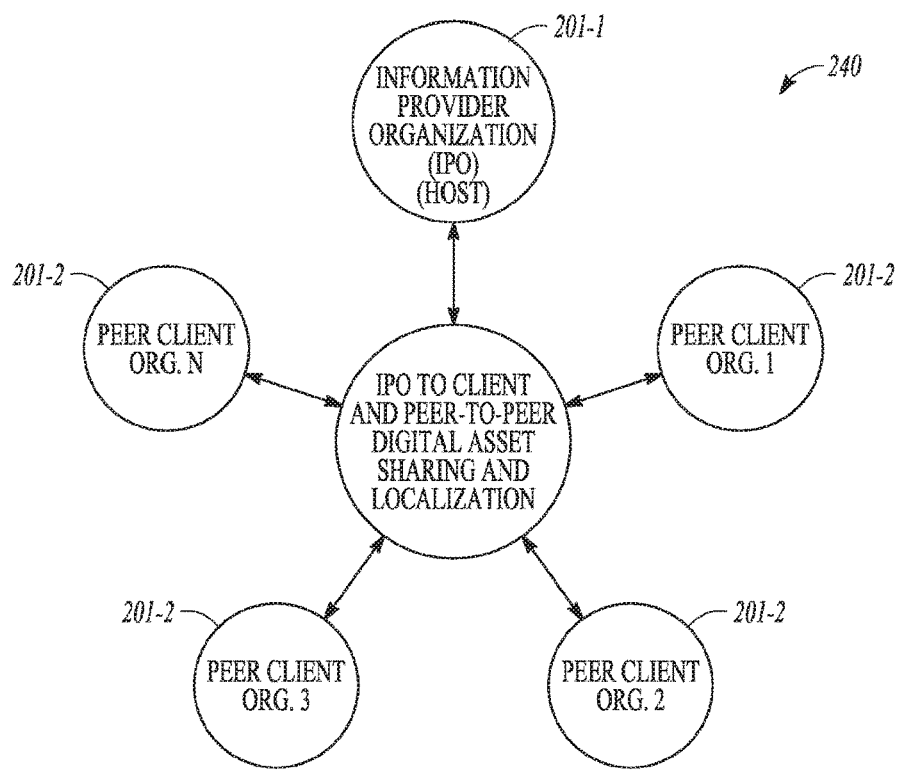

FIG. 3 is a block diagram illustrating the mobile device 400, according to an example embodiment, for deploying and/or implementing the digital asset 160 management and sharing system and methods described herein. The device 400 may include a processor 410. The processor 410 may be any of a variety of different types of commercially available processors suitable for mobile devices, for example, an XScale architecture microprocessor, a Microprocessor without Interlocked Pipeline Stages (MIPS) architecture processor, or another type of processor. A memory 420, such as a Random Access Memory (RAM), a Flash memory, or other type of memory, is typically accessible to the processor. The memory 420 may be adapted to store an operating system (OS) 430, as well as application programs 440, such as a mobile location enabled application that may provide LBS's to a user. The processor 410 may be coupled, either directly or via appropriate intermediary hardware, to a display 450 and to one or more input/output (I/O) devices 460, such as a keypad, a touch panel sensor, a microphone, etc. Similarly, in some embodiments, the processor 410 may be coupled to a transceiver 470 that interfaces with an antenna 490. The transceiver 470 may be configured to both transmit and receive cellular network signals, wireless data signals, or other types of signals via the antenna 490, depending on the nature of the device 400. In this manner, the connection 410 with the communication network 420 may be established. Further, in some configurations, a GPS receiver 480 may also make use of the antenna 490 to receive GPS signals.

Example Platform Architecture

Figures 1, 2, 3, 4:
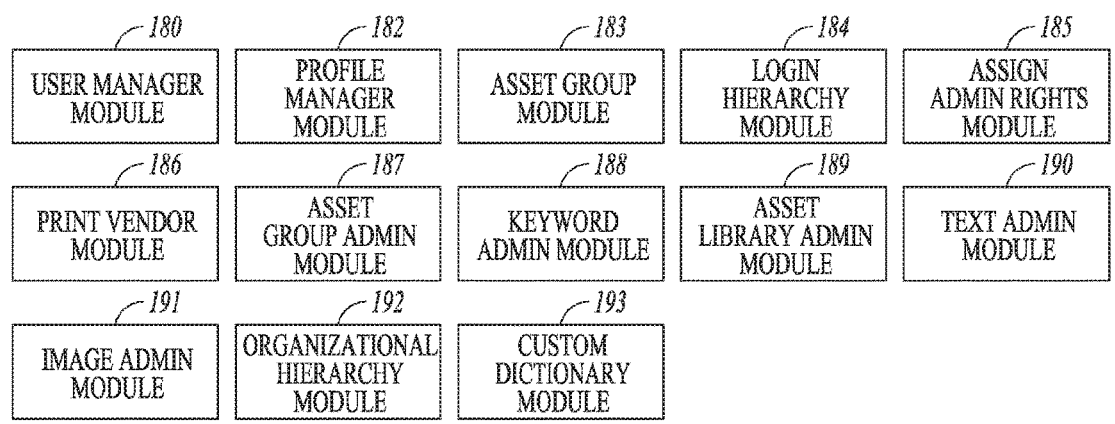
Figure 2:
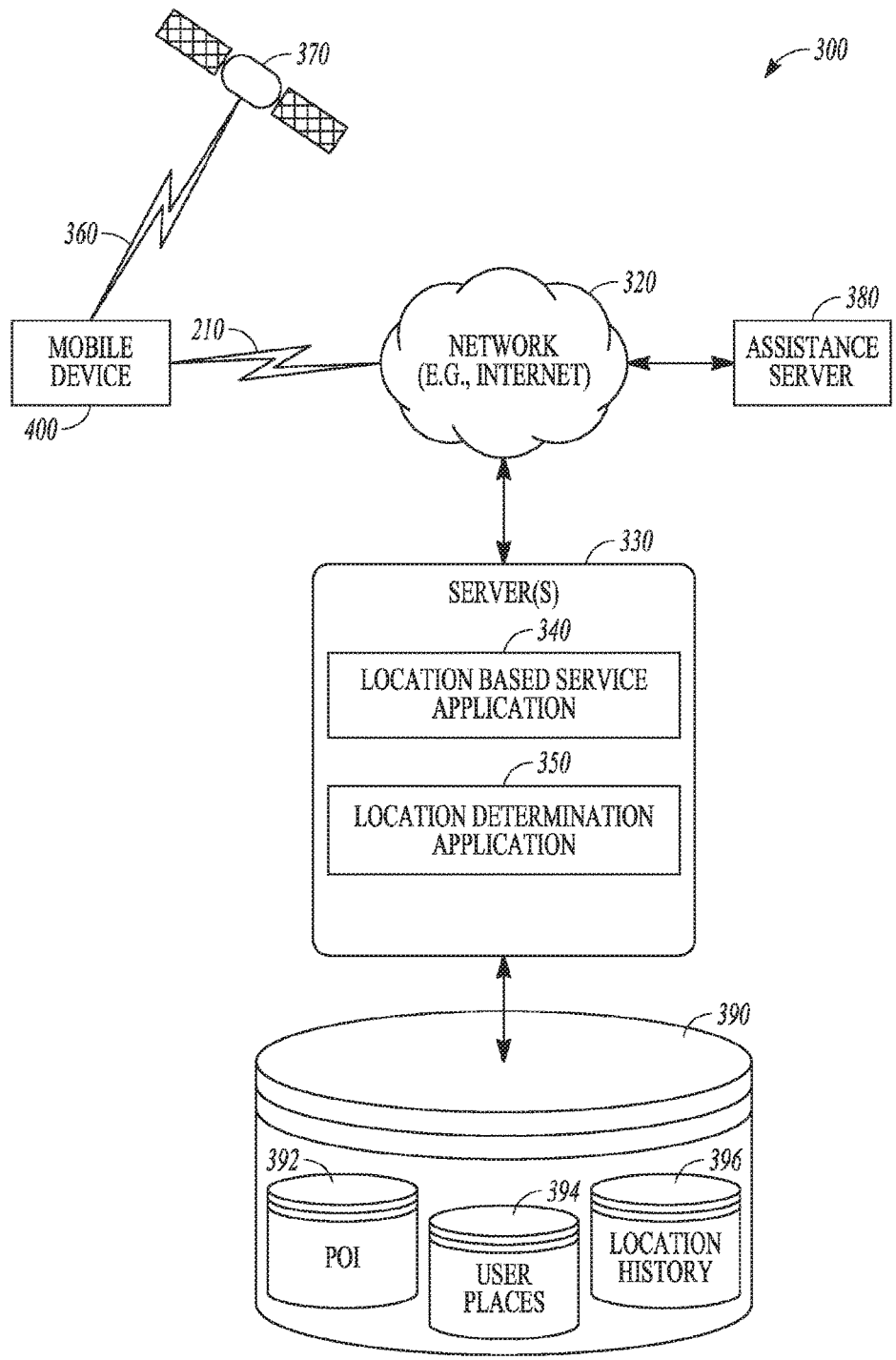
Figure 3:
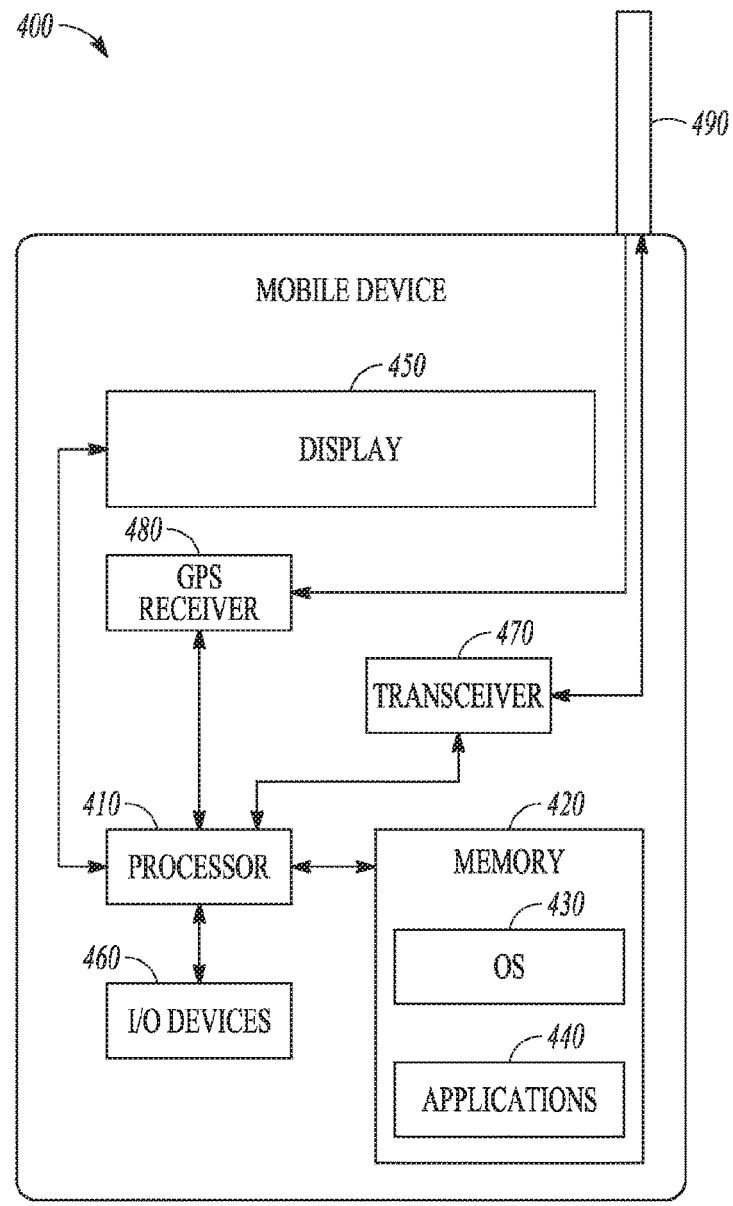
Figure 4:
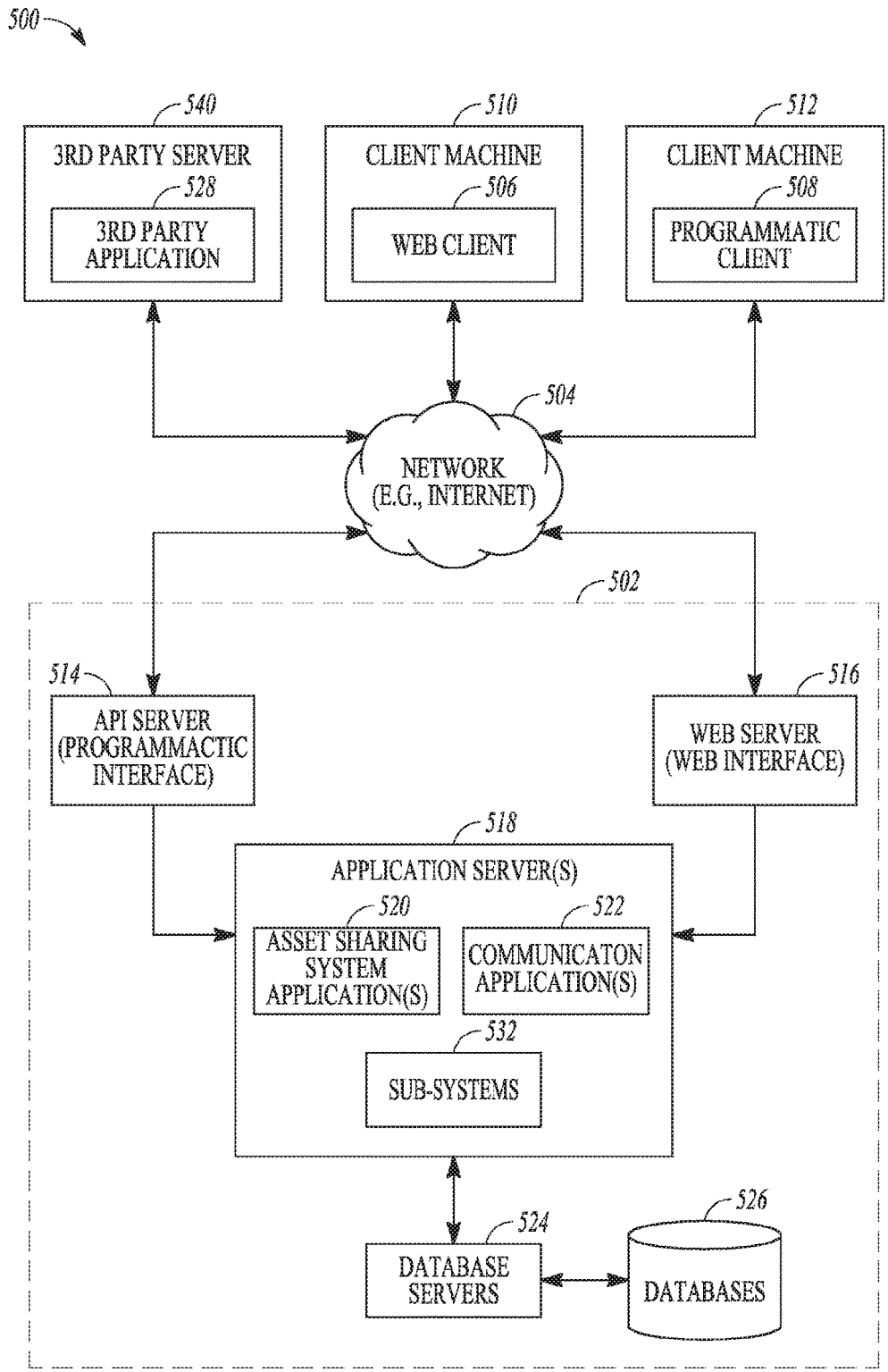

FIG. 4 is a block diagram illustrating a network-based system 500 for deploying and/or implementing the digital asset 160 sharing system and methods described herein. In an embodiment, the system operates in real time or near real-time. The block diagram depicting a client-server system 500, within which an example embodiment may be deployed is described. A networked system 502, in the example forms a network-based digital asset 160 management and sharing system, provides server-side functionality, via a network 504 (e.g., the Internet or Wide Area Network (WAN)) to one or more clients 510, 512. FIG. 4 illustrates, for example, a web client 506 (e.g., a browser, such as the Internet Explorer browser developed by Microsoft Corporation of Redmond, Wash. State), and a programmatic client 508 executing on respective client machines 510 and 512. In an example, the client machines 510 and 512 may be in the form of a mobile device, such as mobile device 400.

An Application Programming Interface (API) server 514 and a web server 516 are coupled to, and provide programmatic and web interfaces respectively to, one or more application servers 518. The application servers 518 host one or more digital asset 160 sharing applications 520 (in certain examples these computer program components are those described herein for the digital asset 160 sharing system 100), communication applications 522, and other sub-systems 532. The application servers 518 are, in turn, shown to be coupled to one or more database servers 524 that facilitate access to one or more databases 526. In some examples, the application server 518 may access the databases 526 directly without the need for a database server 524.

Figure 5:
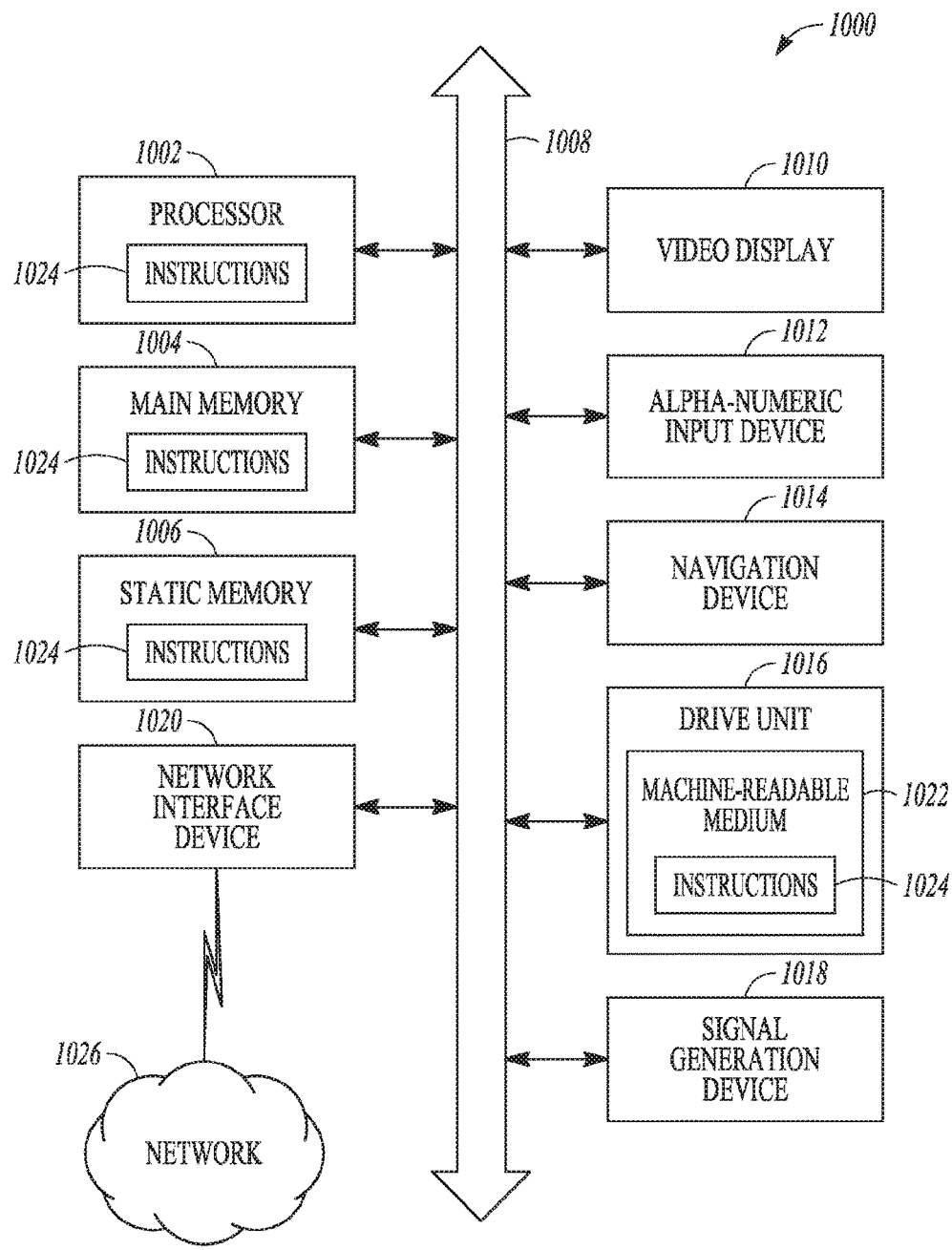
FIG. 5 is a diagrammatic representation of a machine in the example form of a computer system within which a set of instructions for causing the machine to perform any one or more of the methodologies discussed herein may be executed.

The asset management and sharing applications 520 may provide a number of asset management and sharing functions and services to users that access the networked system 502, as described otherwise herein. The communication applications 522 may likewise provide a number of communication services and functions to users, for example to interface with and send messages and data between various communication applications, including e-mail services, text messaging services, instant messaging services, or other communication services, such as messaging through social media platforms. While the asset sharing applications 520 and communication applications 522, and other sub-systems 532 are shown in FIG. 5 to all form part of the networked system 502, it will be appreciated that, in alternative embodiments, the applications 520 and 522 or others may form part of a service that is separate and distinct from the networked system 502.

Further, while the system 500 shown in FIG. 4 employs a client-server architecture, the present invention is of course not limited to such an architecture, and could equally well find application in a distributed, or peer-to-peer, architecture system, for example. The various applications 520, applications 522, and sub-system 532 could also be implemented as standalone software programs, which do not necessarily have networking capabilities.

The web client 506 accesses the various asset management and sharing applications 520, communication applications 522, and optional sub-systems 532 via the web interface supported by the web server 516. Similarly, the programmatic client 508 accesses the various services and functions provided by the applications, servers 520, 522 and 532 via the programmatic interface provided by the API server 514. The programmatic client 508 may, for example, be a local recommendation smartphone application to enable users to receive real-time location-aware merchant promotions on their smartphones leveraging user profile data and current location information provided by the smartphone.

FIG. 4 also illustrates a third party application 528, executing on a third party server machine 540, as having programmatic access to the networked system 502 via the programmatic interface provided by the API server 514. For example, the third party application 528 may, utilizing information retrieved from the networked system 502, support one or more features or functions on a website hosted by the third party. The third party website may, for example, provide one or more functions that are supported by the relevant applications of the networked system 502.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

FIG. 5 is a block diagram of a machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or used by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

EXAMPLES

In Example 1, a computerized system includes a computing system capable of executing computer program instructions to retrieve, manipulate, create and/or store data, receive input from a user through a computer input device for the purpose of directing the operation of the computing system, and display information to a user through a user interface, the system including data specifying a first organization and data specifying a second organization, and a data storage system including computer program components including computer instructions executable on the computing system to receive and store, in the data storage system, a digital asset, wherein the digital asset is provided by the first organization as identified based on the data specifying the first organization, receive and store, in the data storage system, a digital asset build rule from the second organization as identified based on the data specifying the second organization, the digital asset build rule including at least one of a rule for building a localized digital asset and organization information related to the second organization for incorporation into the localized digital asset, and build, using the computing system, and store in the data storage system a localized digital asset using the digital asset and the digital asset build rule.

In Example 2, the computerized system of Example 1 optionally further includes that the first organization and the second organization are peer client organizations.

In Example 3, the computerized system of any one or more of Examples 1 and 2 optionally further includes that the computer instructions are further configured to receive and store, in the data storage system, digital asset build rules from the second organization and at least one of the first organization and a third organization and the computer instructions are further configured to build, using the computing system, and store in the data storage system a localized digital asset using the digital asset build rules.

In Example 4, the computerized system of any one or more of Examples 1-3 optionally further includes that the first organization is a commercial information provider organization and the second organization is one of a plurality of client organizations, the computer instructions are further configured to receive and store, in the data storage system, digital asset build rules from the client organizations, and the computer instructions are further configured to build, using the computing system, and store in the data storage system a localized digital asset using the digital asset build rules.

In Example 5, the computerized system of any one or more of Examples 1-4 optionally further includes that the computer instructions are further executable on the computer system to receive or define one or more templates provided by at least one of the first and second organizations.

In Example 6, the computerized system of any one or more of Examples 1-5 optionally further includes that the computer instructions are further executable on the computer system to allow the at least one of the first and second organizations to selectively access and use either digital assets provided by the at least one of the first and second organizations.

In Example 7, the computerized system of any one or more of Examples 1-6 optionally further includes that the computer instructions are further executable on the computer system to cause the digital assets provided by one of the first and second organizations to be made available to at least two or more different other organizations.

In Example 8, the computerized system of any one or more of Examples 1-7 optionally further includes that the first and second organizations are each engaged in substantially the same trade or business.

In Example 9, the computerized system of any one or more of Examples 1-8 optionally further includes that the computer instructions are further executable on the computer system to enable a host organization that is not one of the first and second organizations to authorize the first and second organizations to access the computing system.

In Example 10, the computerized system of any one or more of Examples 1-9 optionally further includes that the computer instructions are further executable on the computer system to receive digital assets provided by at least one of the first and second organizations, and further to receive build rules from the at least one of the first and second organization, wherein the build rules are configured to localize the digital assets provided by the at least one of the first and second organizations.

In Example 11, a computerized method includes receiving, through a computer input mechanism, a digital asset, wherein the digital asset is provided by a first organization as identified based on data specifying the first organization, storing the digital asset in a data storage system, receiving, through the computer input mechanism, a digital asset build rule from a second organization as identified based on data specifying the second organization, the digital asset build rule including at least one of a rule for building a localized digital asset and organization information related to the second organization for incorporation into the localized digital asset, storing the digital asset build rule in the data storage system, building, using a computing system, a localized digital asset using the digital asset and the digital asset build rule, and storing the localized digital asset in the data storage system.

In Example 12, the computerized method of Example 11 optionally further includes that the first organization and the second organization are peer client organizations.

In Example 13, the computerized method of any one or more of Examples 11 and 12 optionally further includes receiving and digital asset build rules from the second organization and at least one of the first organization and a third organization, storing the digital asset build rules from the second organization in the data storage system, building, using the computing system, a second localized digital asset using the digital asset build rules, and storing the second digital asset build from the second organization in the data storage system.

In Example 14, the computerized method of any one or more of Examples 11-13 optionally further includes that the first organization is a commercial information provider organization and the second organization is one of a plurality of client organizations and further including receiving digital asset build rules from the client organizations and building, using the computing system, a localized digital asset using the digital asset build rules.

In Example 15, the computerized method of any one or more of Examples 11-14 optionally further includes receiving one or more templates provided by at least one of the first and second organizations.

In Example 16, the computerized method of any one or more of Examples 11-15 optionally further includes allowing the at least one of the first and second organizations to selectively access and use either digital assets provided by the at least one of the first and second organizations.

In Example 17, the computerized method of any one or more of Examples 11-16 optionally further includes causing the digital assets provided by one of the first and second organizations to be made available to at least two or more different other organizations.

In Example 18, the computerized method of any one or more of Examples 11-17 optionally further includes that the first and second organizations are each engaged in substantially the same trade or business.

In Example 19, the computerized method of any one or more of Examples 11-18 optionally further includes enabling a host organization that is not one of the first and second organizations to authorize the first and second organizations to access the computing system.

In Example 20, the computerized method of any one or more of Examples 11-19 optionally further includes receiving digital assets provided by at least one of the first and second organizations, and further to receive build rules from the at least one of the first and second organization, wherein the build rules are configured to localize the digital assets provided by the at least one of the first and second organizations.

Thus, a method and system for computer guided asset management and sharing have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computerized system, comprising:
one or more processors and executable instructions accessible on a computer-readable medium that, when executed, cause the one or more processors to perform operations comprising:
receive, by a first organization, a non-localized digital asset;
store, in a data storage system of the computerized system, the non-localized digital asset, wherein the non-localized digital asset is provided by the first organization as identified based on the data specifying the first organization;
receive, from a second organization, a digital asset build rule, the digital asset build rule specifying template information and brand information related to the second organization for incorporation into the non-localized digital asset;
store, in the data storage system, the digital asset build rule from the second organization as identified based on the data specifying the second organization; and
build, using a computing system of the computerized system, and store in the data storage system a localized digital asset using the non-localized digital asset and the digital asset build rule, the digital asset build rule being used by the first and second organization; and authorize a host organization that is not one of the first and second organizations to authorize the first and second organizations to access the computing system.

2. The computerized system according to claim 1, wherein the first organization and the second organization are peer client organizations.

3. The computerized system according to claim 1; wherein:
the computer instructions are further configured to receive and store, in the data storage system, digital asset build rules from the second organization and at least one of the first organization and a third organization; and
the computer instructions are further configured to build, using the computing system, and store in the data storage system a localized digital asset using the digital asset build rules.

4. The computerized system according to claim 1; wherein:
the first organization is a commercial information provider organization and the second organization is one of a plurality of client organizations;
the computer instructions are further configured to receive and store, in the data storage system, digital asset build rules from the client organizations; and
the computer instructions are further configured to build, using the computing system, and store in the data storage system a localized digital asset using the digital asset build rules.

5. The computerized system according to claim 1, wherein the computer instructions are further executable on the computer system to receive and define one or more templates provided by at least one of the first and second organizations.

6. The computerized system according to claim 5, wherein the computer instructions are further executable on the computer system to receive a request, from the first and second organizations to selectively access and use either digital assets provided by the at least one of the first and second organizations.

7. The computerized system according to claim 1, wherein the computer instructions are further executable on the computer system to cause the digital assets provided by one of the first and second organizations to be made available to at least two or more different other organizations.

8. The computerized system according to claim 1, wherein the first and second organizations are each engaged in the same trade or business.

9. The computerized system according to claim 1, wherein the computer instructions are further executable on the computer system to receive non-localized digital assets provided by at least one of the first and second organizations, and further to receive build rules from the at least one of the first and second organization, wherein the build rules are configured to localize the non-localized digital assets provided by the at least one of the first and second organizations.

10. A computerized method, comprising:
receiving, through a computer input mechanism, a non-localized digital asset, wherein the non-localized digital asset is provided by a first organization as identified based on data specifying the first organization;
storing the non-localized digital asset in a data storage system;
receiving, through the computer input mechanism, a digital asset build rule from a second organization as identified based on data specifying the second organization, the digital asset build rule specifying template information and brand information related to the second organization for incorporation into the non-localized digital asset;
storing the digital asset build rule in the data storage system;
building, using a computing system, a localized digital asset using the non-localized digital asset and the digital asset build rule;
storing the localized digital asset in the data storage system; and
authorizing a host organization that is not one of the first and second organizations to authorize the first and second organizations to access the computing system.

11. The computerized method according to claim 10, wherein the first organization and the second organization are peer client organizations.

12. The computerized method according to claim 10, further comprising:
receiving digital asset build rules from the second organization and at least one of the first organization and a third organization;
storing the digital asset build rules from the second organization in the data storage system;
building, using the computing system, a second localized digital asset using the digital asset build rules; and
storing the second digital asset build from the second organization in the data storage system.

13. The computerized method according to claim 10, wherein the first organization is a commercial information provider organization and the second organization is one of a plurality of client organizations and further comprising:
receiving digital asset build rules from the client organizations; and
building, using the computing system, a localized digital asset using the digital asset build rules.

14. The computerized method according to claim 10, further comprising receiving one or more templates provided by at least one of the first and second organizations.

15. The computerized method according to claim 14, further comprising receiving a request from the first and second organizations to selectively access and use either digital assets provided by the at least one of the first and second organizations.

16. The computerized method according to claim 10, further comprising causing the digital assets provided by one of the first and second organizations to be made available to at least two or more different other organizations.

17. The computerized method according to claim 10, wherein the first and second organizations are each engaged in the same trade or business.

18. The computerized method according to claim 10, further comprising receiving non-localized digital assets provided by at least one of the first and second organizations, and further to receive build rules from the at least one of the first and second organization, wherein the build rules are configured to localize the non-localized digital assets provided by the at least one of the first and second organizations.

* * * * *

UNITED STATES PATENT AND TRADEMARK OFFICE
CERTIFICATE OF CORRECTION

PATENT NO. : 9,984,094 B2  
APPLICATION NO. : 14/896656  
DATED : May 29, 2018  
INVENTOR(S) : Michael Brown Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 25, Line 11, in Claim 3, delete "claim 1;" and insert --claim 1,-- therefor In Column 25, Line 21, in Claim 4, delete "claim 1;" and insert --claim 1,-- therefor Signed and Sealed this  
Twenty-eighth Day of May, 2019

Andrei Iancu  
*Director of the United States Patent and Trademark Office*